(12) United States Patent
Derusseau et al.

(10) Patent No.: US 9,081,815 B2
(45) Date of Patent: Jul. 14, 2015

(54) GOLF COURSE FITTING SYSTEM

(71) Applicant: P3 DESIGNS, LLC, Southern Pines, NC (US)

(72) Inventors: Chad Houston Derusseau, Southern Pines, NC (US); Carolyn Margaret Derusseau, Raeford, NC (US)

(73) Assignee: P3 DESIGNS, LLC, Southern Pines, NC (US)

( * ) Notice: Subject to any disclaimer, the term of this patent is extended or adjusted under 35 U.S.C. 154(b) by 155 days.

(21) Appl. No.: 13/858,529

(22) Filed: Apr. 8, 2013

(65) Prior Publication Data

US 2013/0332480 A1      Dec. 12, 2013

Related U.S. Application Data

(60) Provisional application No. 61/621,934, filed on Apr. 9, 2012.

(51) Int. Cl.
*G06F 17/30* (2006.01)
*G06Q 50/00* (2012.01)

(52) U.S. Cl.
CPC .... *G06F 17/30477* (2013.01); *G06F 17/30398* (2013.01); *G06Q 50/00* (2013.01)

(58) Field of Classification Search
CPC .................................................. G06F 17/30477
USPC .......................................................... 707/769
See application file for complete search history.

(56) References Cited

U.S. PATENT DOCUMENTS

2010/0179005 A1* 7/2010 Meadows et al. ............. 473/407
2012/0320089 A1* 12/2012 Kreft ............................. 345/629

* cited by examiner

*Primary Examiner* — Apu Mofiz
*Assistant Examiner* — Cindy Nguyen
(74) *Attorney, Agent, or Firm* — Oliff PLC; R. Brian Drozd

(57) ABSTRACT

A method, device and computer program product for a golf course searching system. Various characteristics of golf courses are stored in a database. A user may log onto the golf course searching system and define parameters of a golf course of interest and the system will output information about which golf courses the user should pursue.

10 Claims, 31 Drawing Sheets

STYLE [P]
SELECT A GOLF COURSE STYLE CLASSIFICATION

● PARKLAND  ○ LINKS  ○ MOUNTAIN
○ HEATHLAND  ○ DESERT

LAYOUT [L]
USE THE GOLF BALL SLIDER TO ADJUST THE
GOLF COURSE LAYOUT CLASSIFICATION

LEFT DOG LEG       BALANCED       RIGHT DOG LEG
DOMINANT                           DOMINANT
○                     ○                ○

SAND [1]
USE THE GOLF BALL SLIDER TO ADJUST THE
SAND CLASSIFICATION

○   ○   ○   ○   ○

DIFFICULTY [1]
USE THE GOLF BALL SLIDER TO ADJUST THE
GOLF COURSE DIFFICULTY CLASSIFICATION

○   ○   ○   ○   ○

LENGTH [1]
USE THE GOLF BALL SLIDER TO ADJUST THE
GOLF COURSE LENGTH CLASSIFICATION

○   ○   ○   ○   ○

WATER [1]
USE THE GOLF BALL SLIDER TO ADJUST THE
GOLF COURSE WATER CLASSIFICATION

| CITY | STATE | RADIUS (MILES) |
|---|---|---|

OR

| ZIP | RADIUS (MILES) |
|---|---|

OR

DESTINATION

AND

PRICE

CANCEL  SEARCH

FIG. 8

| Course Name | Sand | Sand % | Water | Water % | Max Dist | Slope | Par | Par less 3 | L Dogleg | R Dogleg | L and R D | Ball F. Sand | PS | Wate | Lengt | Diff | PS | Style |
|---|---|---|---|---|---|---|---|---|---|---|---|---|---|---|---|---|---|---|
| Sunland Village GC | 10 | 0.38462 | 14 | 0.5385 | 3623 | 80 | 62 | 26 | 1 | 0 | 1 B | 1 | | 3 | 1 | 1 | | P |
| Cimarron GC (Pebble) | 16 | 0.72727 | 2 | 0.0909 | 3156 | 84 | 58 | 22 | 0 | 0 | 0 B | 2 | | 0 | 1 | 1 | | P |
| Lakeview GC | 13 | 0.54167 | 5 | 0.2083 | 3001 | 85 | 60 | 24 | 1 | 0 | 1 B | 1 | | 1 | 1 | 1 | | P |
| Rolling Hills GC | 12 | 0.46154 | 0 | 0 | 3828 | 87 | 62 | 26 | 2 | 0 | 2 B | 1 | | 0 | 1 | 1 | | P |
| Desert Sands GC | 0 | 0 | 3 | 0.0968 | 4029 | 89 | 67 | 31 | 0 | 1 | -1 B | 0 | | 0 | 1 | 1 | | P |
| Greenfield Lakes GC | 0 | 0 | 9 | 0.3462 | 4107 | 91 | 62 | 26 | 1 | 0 | 1 B | 3 | | 2 | 1 | 1 | | P |
| The Links at Naples | 23 | 0.92 | 21 | 0.84 | 3985 | 98 | 61 | 25 | 2 | 2 | 0 B | 2 | | 3 | 1 | 1 | | P |
| Ironwood CC | 23 | 0.74194 | 5 | 0.1613 | 5442 | 99 | 67 | 31 | 0 | 0 | 0 B | 2 | | 1 | 1 | 1 | | P |
| Tecolote Canyon GC | 15 | 0.68182 | 9 | 0.4091 | 3161 | 101 | 58 | 22 | 0 | 1 | -1 B | 1 | | 2 | 1 | 1 | | P |
| Palmer Park GC | 11 | 0.31429 | 5 | 0.1429 | 6007 | 104 | 71 | 35 | 1 | 1 | 1 B | 1 | | 1 | 1 | 1 | | P |
| Ahwatukee GC (Lakes) | 21 | 0.875 | 11 | 0.4583 | 4019 | 106 | 60 | 24 | 1 | 1 | -1 B | 2 | | 2 | 1 | 1 | | P |
| Costa Mesa G & CC (Mesa Linda) | 27 | 0.79412 | 2 | 0.0588 | 5551 | 107 | 70 | 34 | 2 | 1 | 1 B | 1 | | 0 | 1 | 1 | | P |
| Winagamie (Woodlands/Highlands) | 15 | 0.46875 | 3 | 0.0938 | 5683 | 107 | 68 | 32 | 2 | 1 | 1 B | 1 | | 0 | 1 | 1 | | P |
| Winagamie (Highlands/Pines) | 11 | 0.34375 | 5 | 0.1563 | 5709 | 107 | 68 | 32 | 2 | 0 | 2 B | 1 | | 1 | 1 | 1 | | P |
| Raleigh Golf Association | 11 | 0.32353 | 2 | 0.0588 | 6410 | 107 | 70 | 34 | 1 | 2 | -1 B | 1 | | 0 | 1 | 1 | | P |
| Painted Mountain GC | 14 | 0.41176 | 10 | 0.2941 | 6021 | 108 | 70 | 34 | 2 | 2 | 0 B | 1 | | 2 | 1 | 1 | | P |
| Chandler Park GC | 24 | 0.68571 | 10 | 0.2857 | 5832 | 109 | 71 | 35 | 1 | 1 | 0 B | 1 | | 2 | 1 | 1 | | P |
| Fairways CC | 15 | 0.44118 | 24 | 0.7059 | 5332 | 110 | 70 | 34 | 2 | 1 | 1 B | 1 | | 3 | 1 | 1 | | P |
| Brevofield GC | 16 | 0.44444 | 1 | 0.0278 | 6094 | 111 | 72 | 36 | 3 | 1 | 2 B | 1 | | 0 | 1 | 1 | | P |
| Riverbend GC | 11 | 0.45833 | 14 | 0.5833 | 3075 | 113 | 60 | 24 | 1 | 0 | 1 B | 1 | | 3 | 1 | 2 | | P |
| Sunset Hills GC (Old Course) | 7 | 0.19444 | 10 | 0.2778 | 6124 | 113 | 72 | 36 | 2 | 1 | 1 B | 1 | | 2 | 1 | 2 | | P |
| Forest Akers GC (The East) | 17 | 0.47222 | 1 | 0.0278 | 6559 | 113 | 72 | 36 | 1 | 1 | 0 B | 1 | | 0 | 1 | 2 | | P |
| Villa de Paz GC | 22 | 0.61111 | 12 | 0.3333 | 6140 | 114 | 72 | 36 | 0 | 3 | -3 B | 1 | | 2 | 1 | 2 | | P |
| Coachman's GR (Red/White) | 16 | 0.45714 | 11 | 0.3143 | 6158 | 114 | 71 | 35 | 3 | 4 | -1 B | 1 | | 2 | 1 | 2 | | P |
| Encanto GC | 20 | 0.58824 | 1 | 0.0294 | 6361 | 114 | 70 | 34 | 5 | 1 | 4 L | 1 | | 0 | 1 | 2 | | P |
| Pinehurst Resort (No. 3) | 19 | 0.55882 | 1 | 0.0294 | 5682 | 115 | 70 | 34 | 3 | 8 | -5 R | 1 | | 0 | 1 | 2 | | P |
| Coachman's GR (Blue/Red) | 19 | 0.54286 | 6 | 0.1714 | 6193 | 115 | 71 | 35 | 4 | 3 | 1 B | 1 | | 1 | 1 | 2 | | P |

GOLF COURSE FITTING SYSTEM

CROSS-REFERENCE TO RELATED APPLICATIONS

The present application is a non-provisional application of U.S. Provisional Patent Application No. 61/621,934, entitled "GOLF COURSE FITTING SYSTEM" and filed on Apr. 9, 2012, which is herein incorporated by reference in its entirety.

BACKGROUND

Golf courses are generally found some distance from population centers and all over the world. Golfers enjoy playing various types of golf courses but most golfers do not know any information about most of the golf courses around the world and must actually play the golf course to learn about the characteristics of that golf course. However, there is no way for golfers to know about golf courses that the golfers have not played or golf courses that would fit what a golfer is looking for.

BRIEF SUMMARY

A method, device and computer program product for a golf course searching system. Various characteristics of golf courses are stored in a database. A user can log onto the golf course searching system and define parameters of a golf course of interest and the system will output information about which golf courses the user should pursue.

In one aspect, a method may include:
providing an interface to search a golf course database comprising a different database entry for each golf course;
receiving, using a computer of a user over a network, a design of a golf course, wherein the design indicates at least two of: a desired style of a golf course, a desired golf course layout, a desired golf course sand difficulty level, a desired golf course water difficult level, or a desired golf course length level;
querying the golf course database with the design; and
providing the user with results of the query where the results comprises a list of golf courses that meet the design via the query so as to allow the user to select a golf course from one of the results.

In another aspect, a method for creating a golf course database may include:
selecting a golf course to determine a golf course personality score;
identify golf course style design of the golf course;
determine an amount of regulation golf shots;
record data for each golf hole of the golf course, whereby the data for each golf hole comprises the golf hole orientation, an amount of regulation sand shots, and an amount of regulation water hazard shots;
record a total length of the golf course;
calculate, using a computer, a sand score by summing the amount of regulation sand shots for all holes of the golf course and dividing by the number of regulation golf shots;
calculate a water score by summing the amount of regulation water shots for all holes of the golf course and dividing by the number of regulation golf shots;
calculate a total amount of dog leg right holes, dog leg left holes and straight holes for the golf course; and
save in a database entry for the golf course the personality score of the golf course comprising the golf course style design, the total length, the total amount of sand points, the total amount of water points, and the total amount of dog leg right holes, dog leg left holes and straight holes for the golf course.

In yet another aspect, a method for a golf course searching may include:
providing an interface to search a golf course database comprising a different database entry for each golf course;
receiving, using a computer of a user over a network, a design of a golf course, wherein the design indicates at least two of: a desired style of a golf course, a desired golf course layout, a desired golf course sand difficulty level, a desired golf course water difficult level, or a desired golf course length level;
querying the golf course database with the design; and
providing the user with results of the query where the results comprises a list of golf courses that meet the design via the query so as to allow the user to select a golf course from one of the results.

BRIEF DESCRIPTION OF THE SEVERAL VIEWS OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein:

FIGS. 1A and 1B (collectively FIG. 1) illustrate graphical user interfaces of a tee-to-green personality design according to some embodiments.

FIG. 8 illustrates a graphical user interface to search the golf fitting system according to one embodiment.

FIG. 11 is an example of entries in the database of the golf course fitting system in accordance with another embodiment of the present invention.

FIG. 12 illustrates another graphical user interface of the golf course fitting system in accordance with another embodiment of the present invention.

DETAILED DESCRIPTION

Figure 1A:
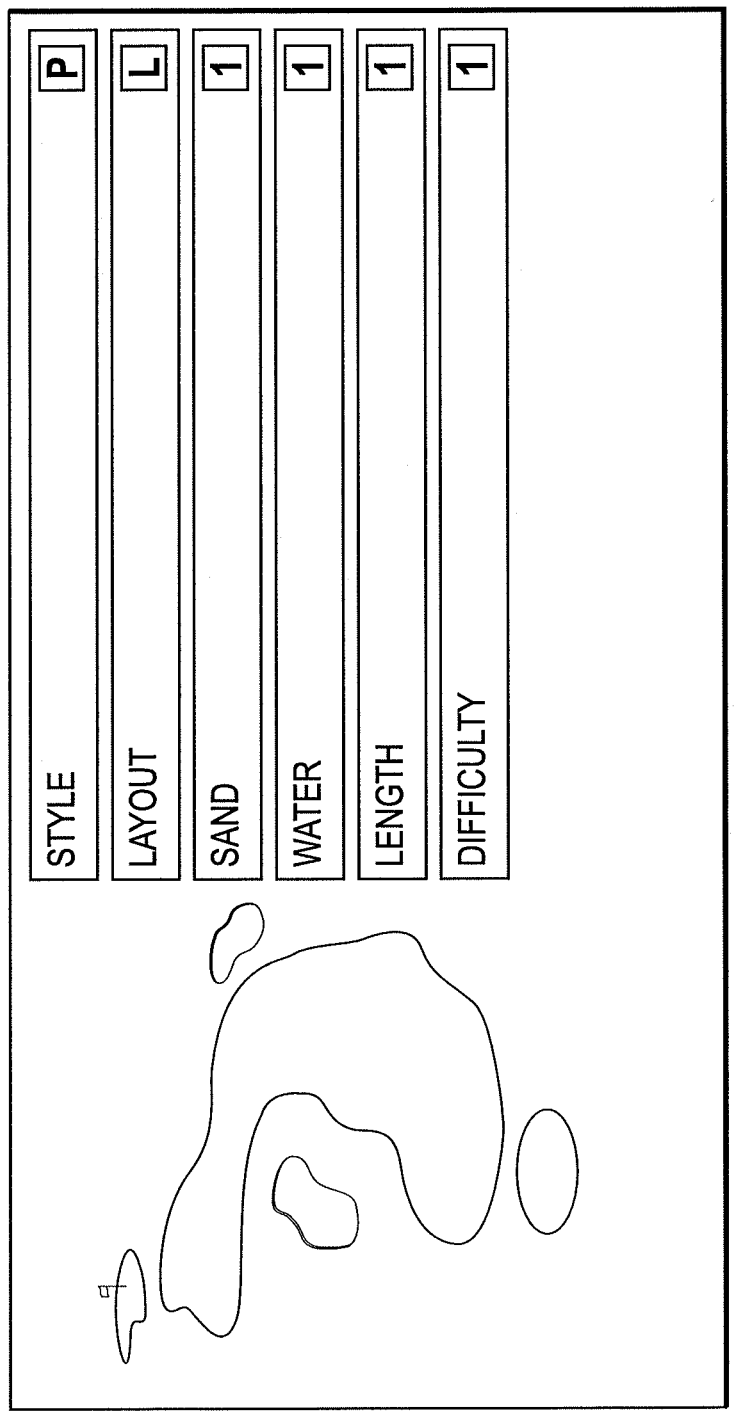

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, a class may define an abstract characteristic of a thing or object, such as a group of code or instructions for performing a particular operation or function. The abstract characteristics may include characteristics of the thing or object, for example attributes, fields or properties, behaviors, such as functions or methods that can be performed by the class. An object is a particular instance of a class. The set of values of the attributes of a particular object is the state of the object. The object includes the state and the behavior that is defined in the object's class. A method is an object's abilities or functions the object can perform.

Prior to discussing various embodiments of the present invention, a brief discussion of some of the terms used herein will now be discussed. The term "Parkland Style Golf Courses" relates to golf courses having the following characteristics: moderate to heavy tree coverage, has ornamental bushes, trees, and grasses; golf course designer manipulated land contours in order to smooth out fairway surfaces; mostly manicured "shorter" grasses, with rich dark green color; and mostly located inland. The term "Hearthland Style Golf Courses" relates to golf courses having the following characteristics: little to moderate tree coverage, has natural bushes and grass; golf course designer manipulated land contours in order to smooth out fairway surfaces; mix of natural "tall" grasses & manicured "shorter" grasses; and located both coastal & inland. The term "Links Style Golf Courses" relates to golf courses having the following characteristics: little to no trees, has natural brushes and grass; natural land contours with little or no work done to smooth out fairway surfaces; mostly natural "tall" coastal grasses; and traditionally located on or near coastal areas. The term "Desert Style Golf Courses" relates to golf courses having the following characteristics: little to moderate tree coverage, has natural rocks, sand and cacti; golf course designer manipulated land contours in order to smooth out fairway surfaces; mostly manicured "shorter" grasses; and mostly inland/desert regions. The term "Mountain Style Golf Courses" relates to golf courses having the following characteristics: moderate to heavy tree coverage, has ornamental bushes, trees, and grasses; golf course designer manipulated land contours in order to smooth out fairway surfaces; mostly manicured "shorter" grasses; traditionally feature large elevation changes throughout the course; and mostly inland/mountainous or hilly regions.

The term "Regulation Golf Shot" (as discussed with regard to FIG. 11a) relates to a "full length" golf shot hit from the tee box or the fairway of a golf hole based on the "par" for the hole. Regulation golf shots do not include "putts". Example of regulation shots for a par 3 hole: Par 3 golf holes are designed for golfers to be able to tee off from the tee box and reach the green in one regulation golf shot, then take two putts for a total Par of 3. Example of regulation shots for a par 4 hole: Par 4 golf holes are designed for golfers to be able to tee off from the tee box and reach the green in two regulation golf shots, then take two putts for a total Par of 4. Example of regulation shots for a par 5 hole: Par 5 golf holes are designed for golfers to be able to tee off from the tee box and reach the green in three regulation golf shots, then take two putts for a total Par of 5.

The term "Dog Leg" is the bending of a golf hole to the left or to the right.

A general summary of some aspects of the invention will now be discussed. Embodiments of the present invention relate to a golf course fitting system (GCFS) which is a software application configured to be embedded in a computer readable medium and run using hardware discussed herein. The software application is a golf course search engine that allows golfers to search for golf courses based on the basic physical design elements of the golf course. This allows golfers to quickly find golf courses that will fit their playing preferences. The application's graphical user interfaces allow users to design a golf course tee-to-green personality with menu options and 3D animations. The golf course animations give the user instant feedback on how their classification choices are affecting the tee-to-green personality design they are creating.

Tee-to-Green Personality

The tee-to-green personality relates to a golf course "personality" formula. The formula takes the basic design characteristics of a golf course and classifies each characteristic based on a detailed analysis of the golf course design. Specific golf course design characteristics are selected for the formulas that may be uniform and consistently represented by all golf courses. The uniform classification of these golf course characteristics into a tee-to-green personality score allows all golf courses to be sorted by these common design characteristics. The tee-to-green personality formula may take five different design characteristics of a golf course: style, layout, sand, water and length. Each of these five characteristics is given a specific classification based on a unique formula. A sixth characteristic that is taken into account and given a classification may be the difficulty of the golf course. The individual classifications are then combined to formulate the overall tee-to-green personality score for the golf course. The golf course fitting system (GCFS) then matches the user to golf courses (e.g., the tee-to-green personality score) that fit their preferences based on characteristics that the user desires. The results of the golf course fitting can be filtered further by other parameters, such as location of the golf courses and the green fee prices (as illustrated in FIG. 8). The tee-to-green personality score may made up of six criteria or more but should not be limited in any way to the above-identified criteria. The score may include two or more characteristics, such as style and layout. Therefore, only some of the characteristics may be employed or all of the characteristics. Additionally, additional characteristics may further be included to the possible characteristics and thus, the present disclosure should not be limited to the six characteristics explicitly discussed above.

After a search is initiated, the system then matches the user to golf courses that fit their playing preferences. All golf courses are stored in a secure database housing each golf courses classification scores for each element so that the golf courses can be sorted and ordered by the users selections.

Therefore, the GCFS allows golfers to search for golf courses, research golf courses, select where to book tee times, book golf travel and play golf, relate to golf courses, and talk about golf course design and playability. The GCFS may be equally used for mobile applications on mobile devices as well. It may also be used for duplication on website platforms.

The following is a more descriptive overview of the GCFS in accordance with some embodiments of the present invention.

Inputting Data into the Database

Figure 14A:
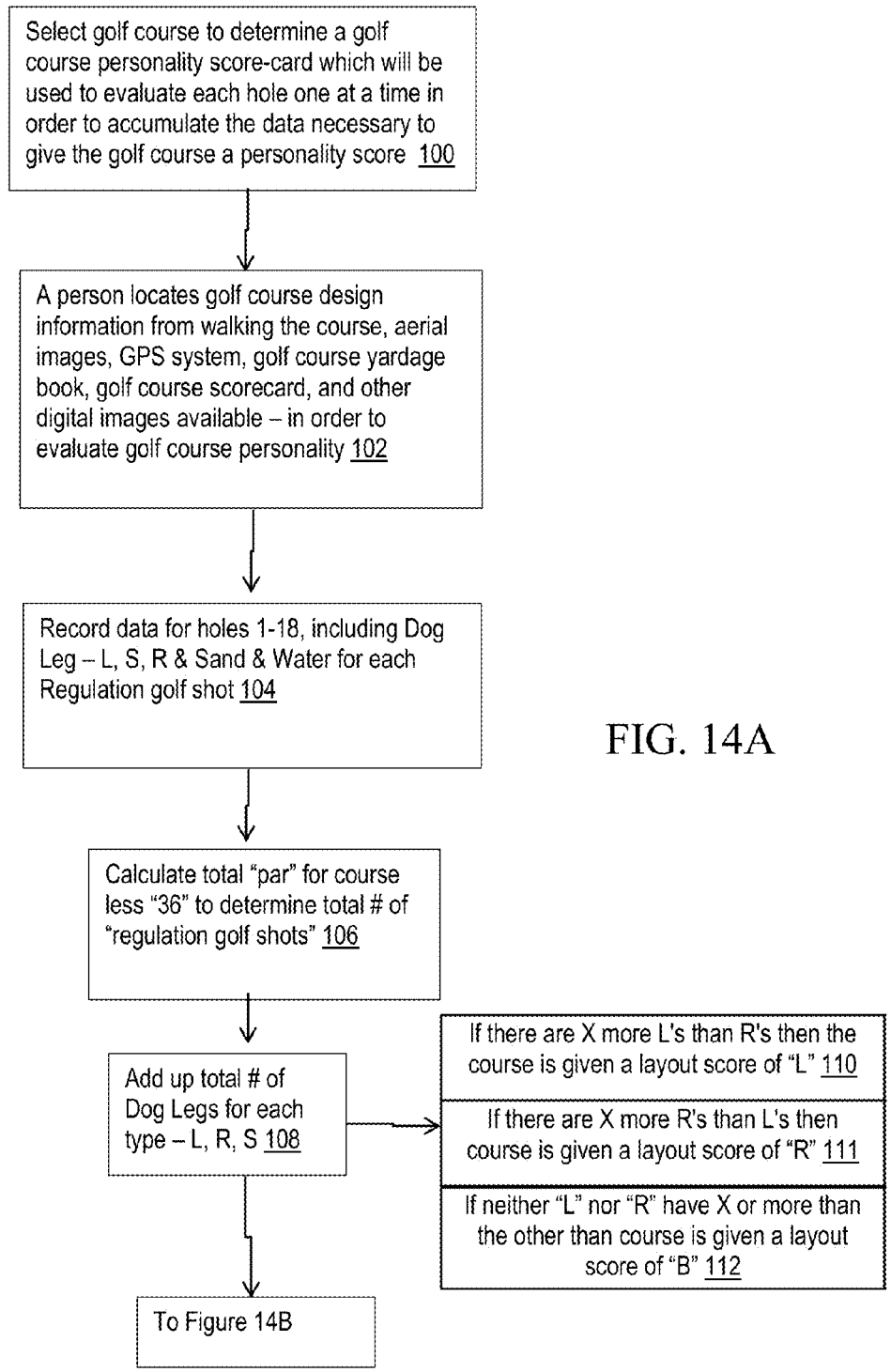
FIGS. 14A and 14B (collectively FIG. 14) is a method for inputting golf courses into the database of the golf course fitting system in accordance with an embodiment of the present invention.
Figure 14B:
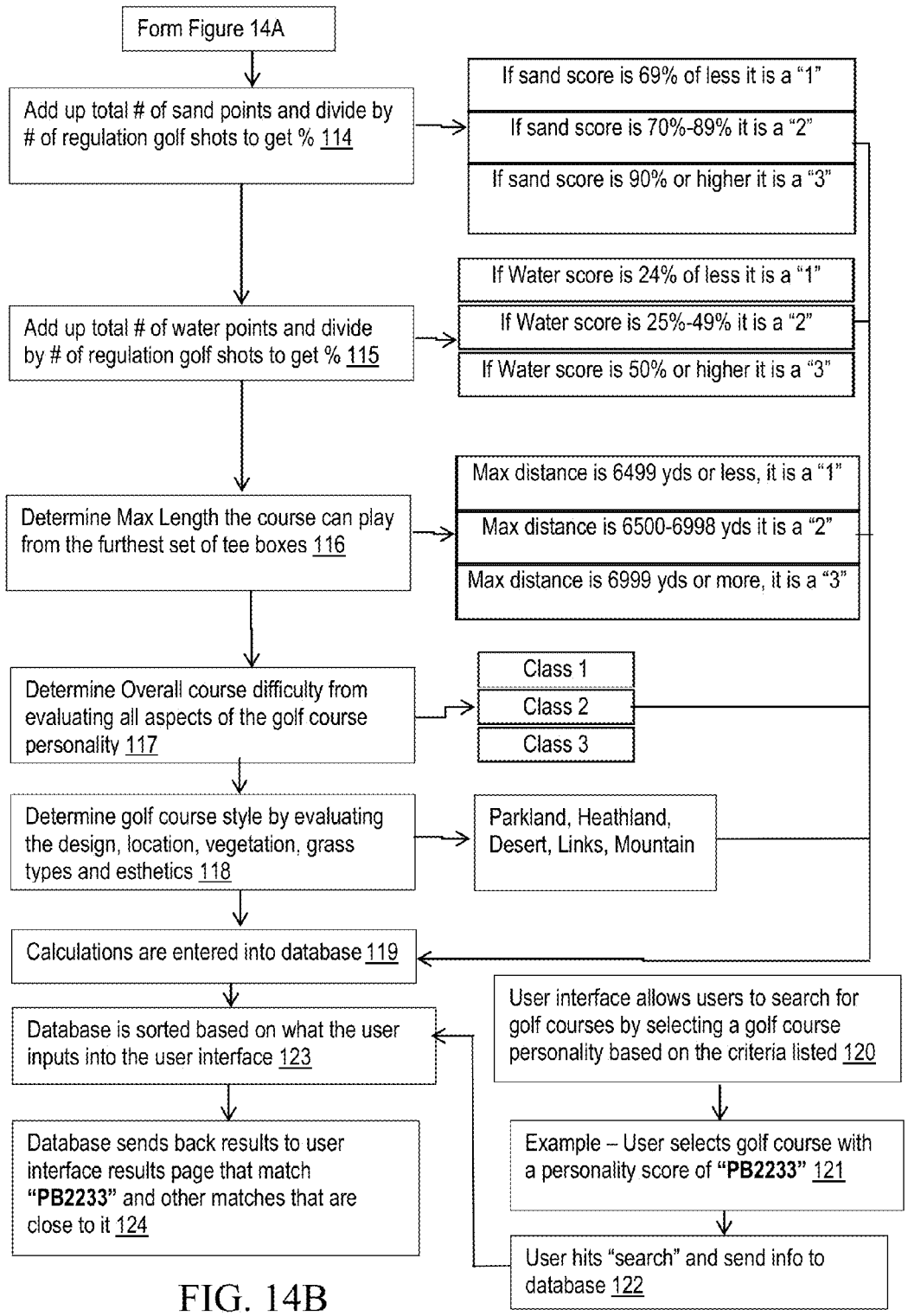

The GCFS includes a database (as discussed later) whereby golf courses and their characteristics are inputted to. This process is discussed with regard to FIG. 14. In FIG. 14, a particular golf course is selected or identified. This golf course is then analyzed and the characteristics and data thereof are inputted into the database as disclosed below.

In block 100 of FIG. 14, a golf course is selected for determining a golf course personality score-card which will be used to evaluate each one at a time in order to accumulate the data necessary to give the golf course a personality score.

In block 102, a person may locate images, drawings, maps, and other information of the golf course layout and design. Alternatively, a person may actually walk the golf course to obtain information about the course (e.g., sand trap information, water locations, distances, etc.). A person may then analyze every hole to determine the style, layout, sand score, water score, length score, and difficulty score. The total of all of these scores for all 18 holes may then be used to determine the total score for each category for that golf course. Each of the style, layout, sand score, water score, length score, and difficulty score are discussed below.

In block 106, a total "par" is determined. This is the number of non-putting strokes, which is the total par strokes for 18 holes minus the number of two putts per hole (i.e., minus 36). Thus, if a course is par-72, then the total "par" score (i.e., non-putting strokes) is 36.

Layout. A score for the layout of the golf score is determined. One aspect of the layout is the number of doglegs (L, S, R), sand hazards, water hazards for each regulation shot on the golf course.

Figure 3A:
FIGS. 3A, 3B, and 3C (collectively FIG. 3) illustrate graphical user interfaces inputting the layout for the tee-to-green personality design according to some embodiments.
Figure 3B:
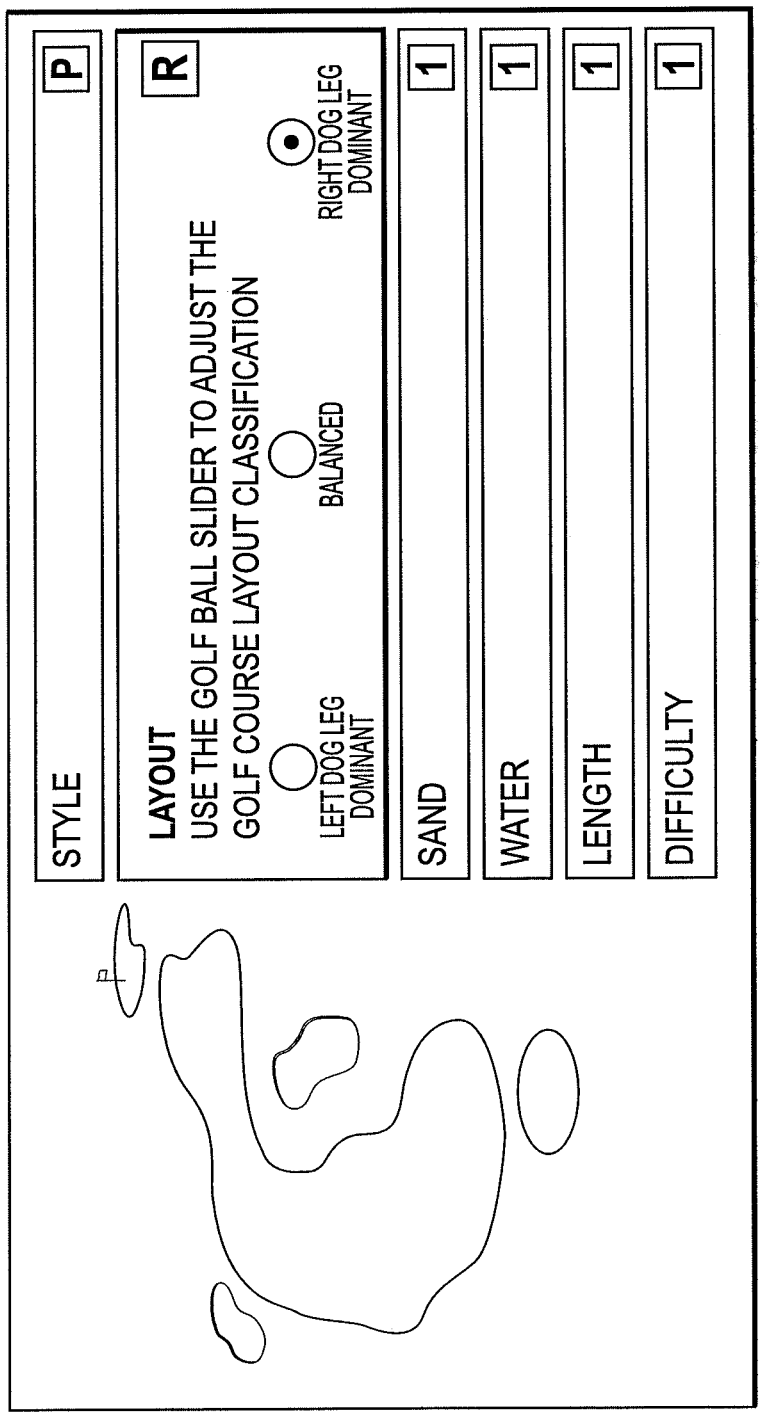
Figure 3C:
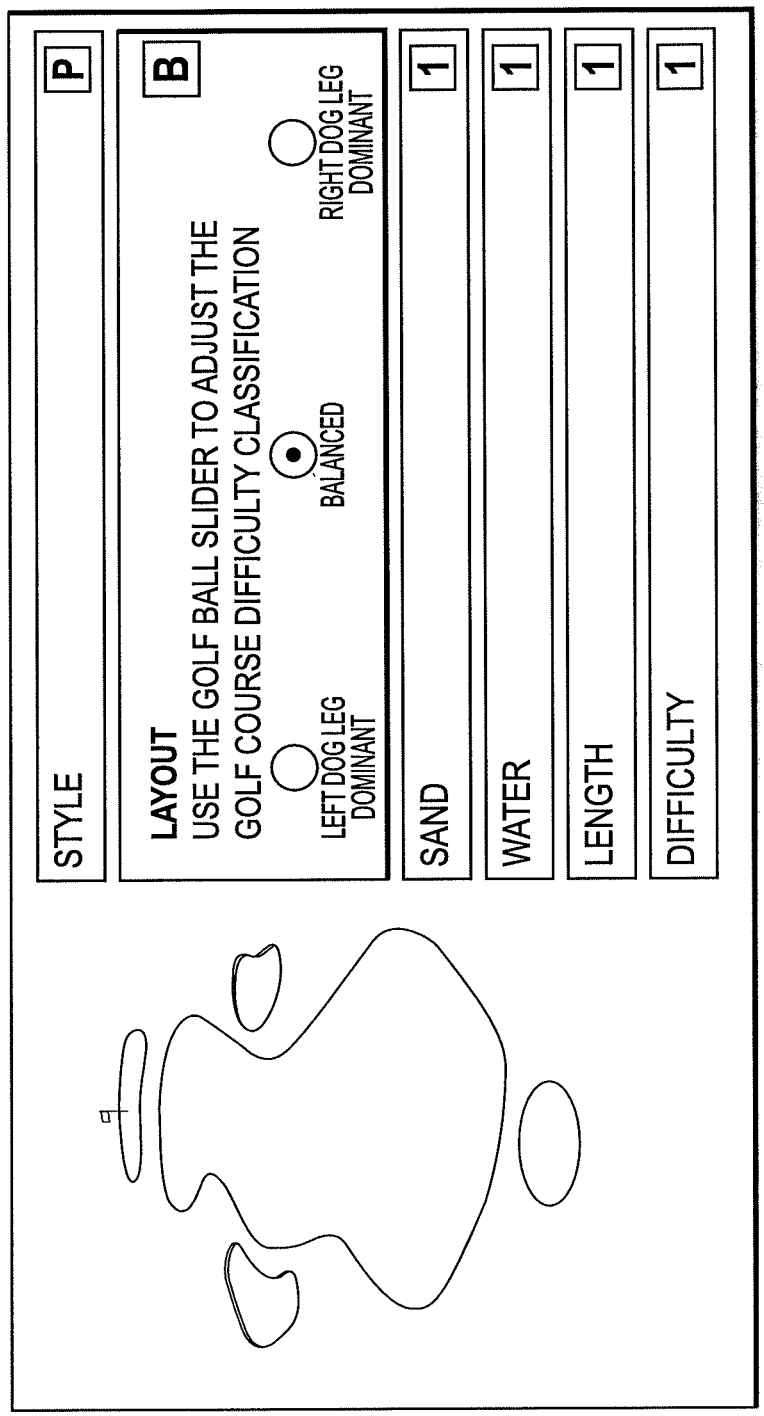

In block 104, the dog leg score for each golf hole is determined. This means determining which of the 18 holes are dog leg left (L) (FIG. 3A), dog leg right (R) (FIG. 3B), or straight (S) (FIG. 3C). For example, hole 1, 4-9 and 12-15 may be a dog leg left holes, holes 2-3, 11, and 17-18 may be dog left right holes, and holes 10 and 16 may be straight. As illustrated in FIGS. 3A-C, each of the images presented to the user will change based on the selection the dogleg left or right or straight.

In block 108, once the total dogleg scores are tallied for all 18 holes the total number of left, straight and right scores are compared. In block 110, if the golf course has a predetermined amount (e.g., four or more) of holes that are dogleg left vs. dogleg right then the course is given a classification of left or "L". In block 111, if the golf course has a predefined amount (e.g., four or more) of holes that are dogleg right vs. dogleg left then the course is given a classification of Right or "R". In block 112, if the difference of doglegs is less than a certain amount (e.g., four) then the golf course is given a classification of Balanced or "B".

Sand—The next characteristic is the sand score. As shown in block 114, the total sand score is determined. Each time a sand hazard must be avoided for a regulation golf shot (e.g., a shot in the fairway or where the ball is likely to be hit from), it is given a sand score of "1" and is added to the total sand score for the course. For example, if a ball is on the tee box and the golfer is aiming for the green or for the center of the fairway, if the golfer has to hit over a sand trap, that will add one point to the sand score. For the next regulation shot, to determine if any sand traps are in play, the user places the ball where an average hit from the teebox would land and so where one expects an average golfer will hit from the fairway. The user then determines how many sand traps are in the way of the next shot. Thus, for each shot, it is assumed that the golfer is aiming for either the center of the fairway or the center of the green. If any sand traps are within the line of sight from a direct line traversing from the ball lie to the center of the fairway (or to the green is within a distance for an average hitter from that lie), then those sand traps would add to the sand score.

All of the regulation sand scores are totaled for all of the holes of the course and then divided by the total number of regulation golf shots there are for the golf course according to the "par" of the golf course. This determines the overall percentage of time the golfer will have to avoid sand on all regulation golf shots. The overall percentage then determines whether a golf course has a sand classification of "one", "two", or "three". A classification of "one" representing a small amount of sand means the golfer will encounter a sand hazard on up to a first predefined percentage (e.g., 69%) of all regulation golf shots. A classification of "two" representing a moderate amount of sand means the golfer will encounter a sand hazard on up to a second predefined percentage (e.g., 89%) of all regulation golf shots. A classification of "three" representing a significant amount of sand means the golfer will encounter a sand hazard on over the second predefined percentage (e.g., 90%-100%) of all regulation golf shots.

Figure 4A:
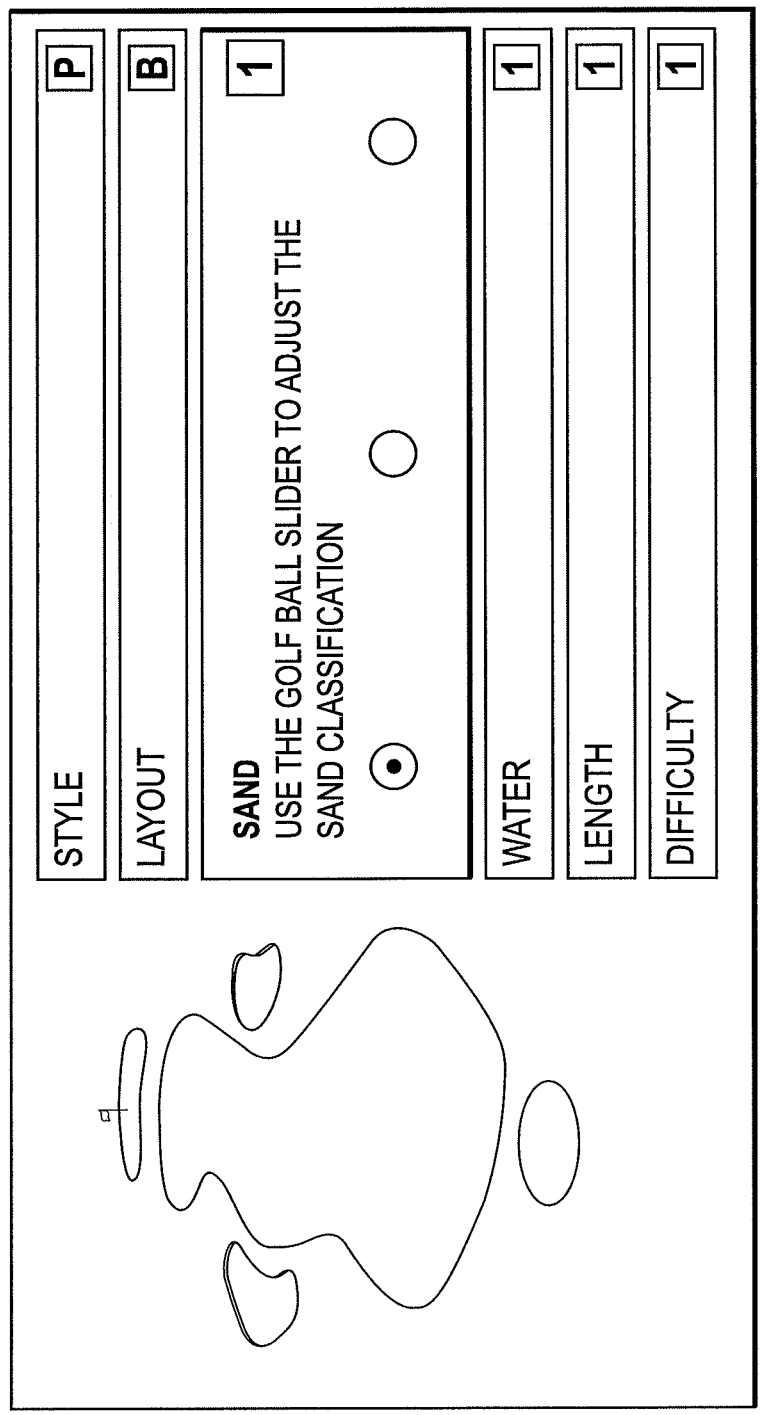
FIGS. 4A, 4B, and 4C (collectively FIG. 4) illustrate graphical user interfaces inputting the sand score for the tee-to-green personality design according to some embodiments.
Figure 4B:
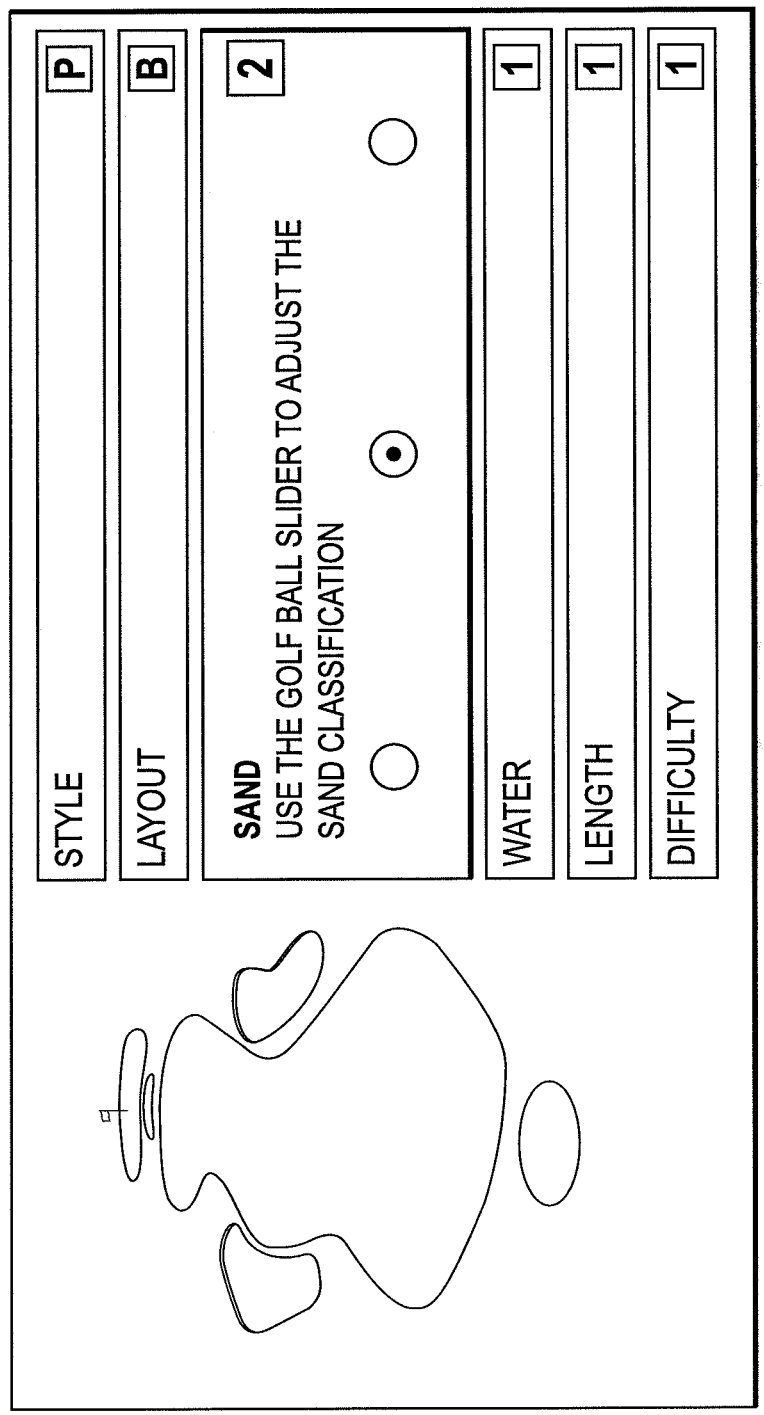
Figure 4C:
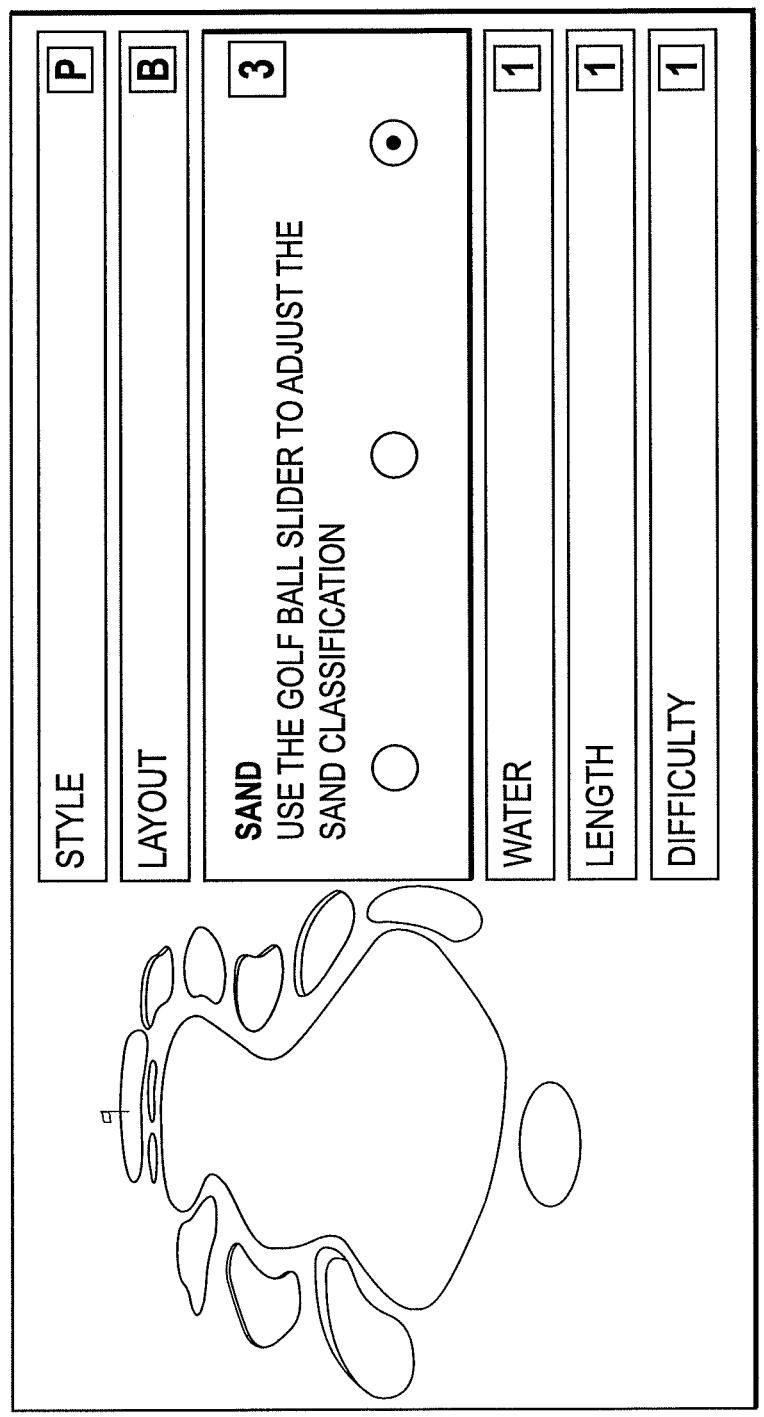

FIGS. 4A-C illustrate the GUI illustrating the different sand scores from 1 to 3. For each score, an image is shown to the user of a sample difficulty, from a sand score of 1 which appears relatively easy with only two sand traps that are not close to the green to a sand score of 3 which has multiple sand traps all around the golf course as illustrated in the image presented to the user.

Water—In block 115, the total water score is determined. Each time a water hazard must be avoided for a regulation golf shot it is given a score of "1". All of the regulation water shot scores are totaled for all holes and then divided by the total number of regulation golf shots there are for the golf course according to the "par" of the golf course. This determines the overall percentage of time the golfer will have to avoid water on all regulation golf shots. The overall percentage then determines whether a golf course has a water classification of "one", "two", or "three". A classification of "one" representing a small amount of water means the golfer will encounter a water hazard on up to a first predetermined percentage (e.g., 24%) of all regulation golf shots. A classification of "two" representing a moderate amount of water means the golfer will encounter a water hazard on up to a second predetermined percentage (e.g., 49%) of all regulation golf shots. A classification of "three" representing a significant amount of water means the golfer will encounter a water hazard on over the second predetermined percentage (e.g., 50% or more) of all regulation golf shots.

Figure 5A:
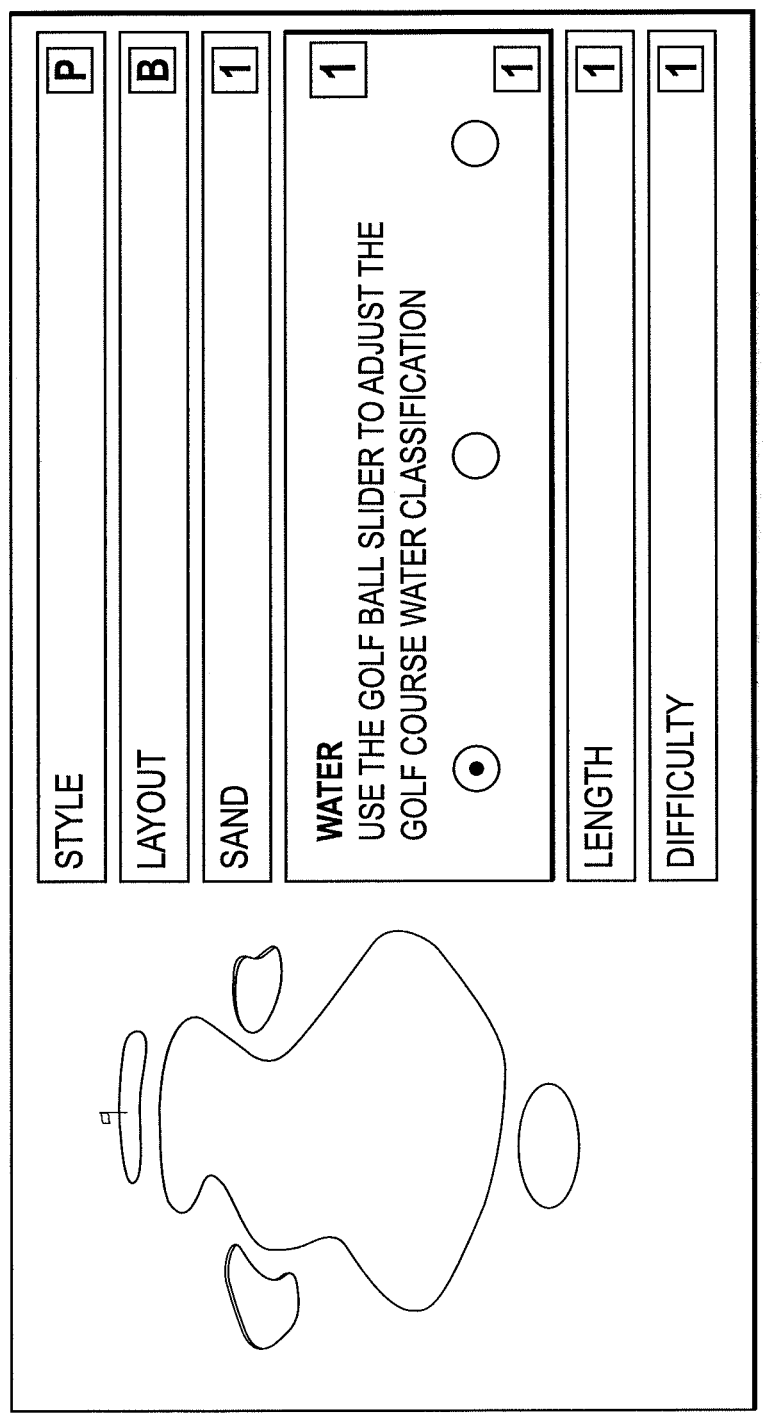
FIGS. 5A, 5B, and 5C (collectively FIG. 5) illustrate graphical user interfaces inputting the water score for the tee-to-green personality design according to some embodiments.
Figure 5B:
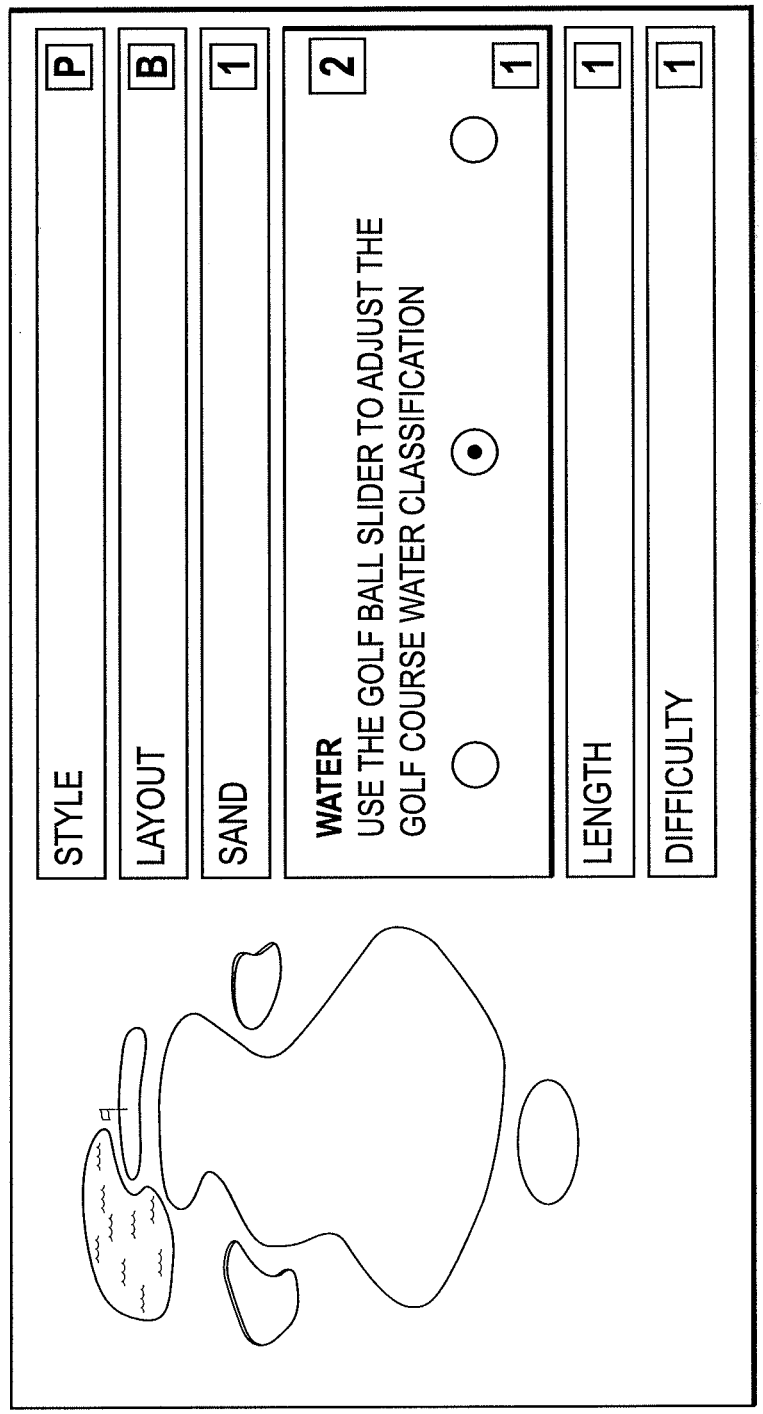
Figure 5C:
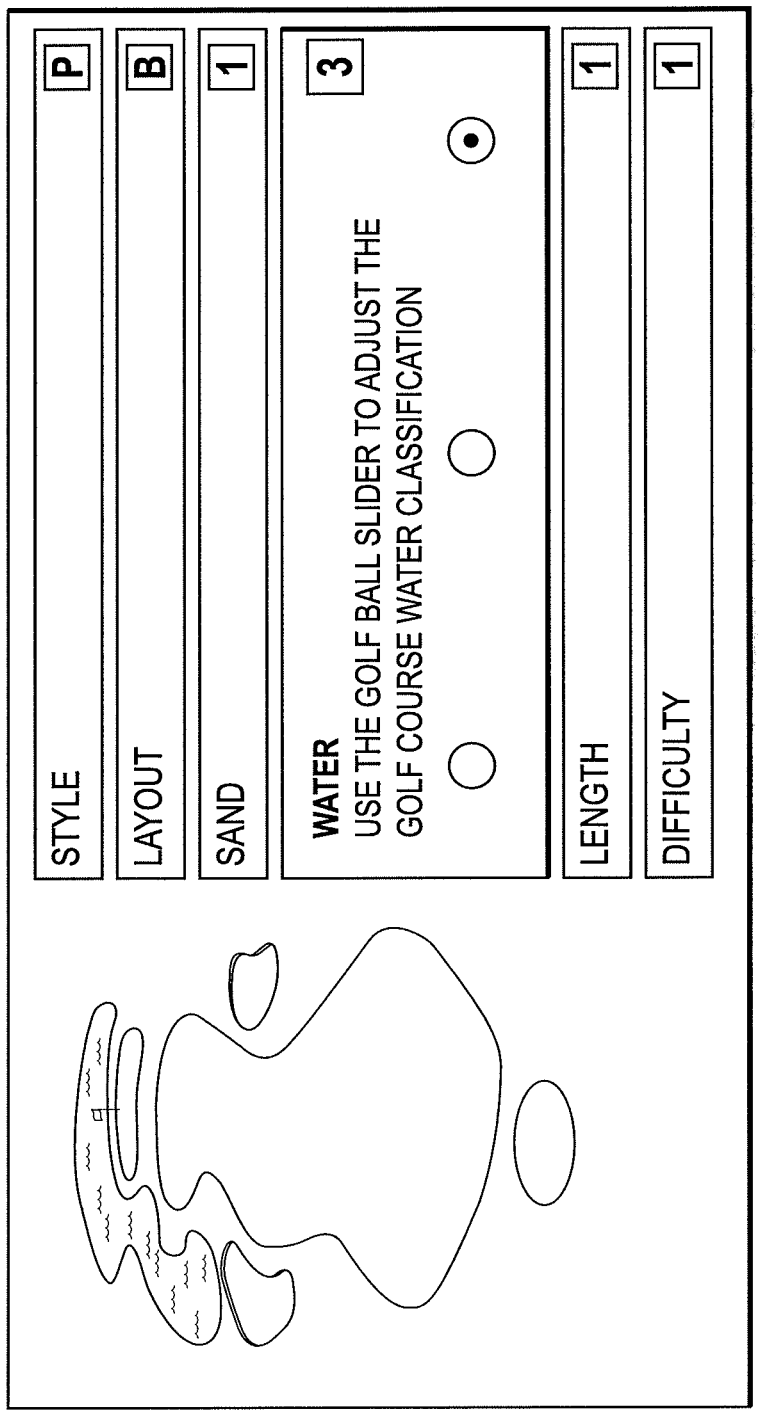

FIGS. 5A-C illustrate the GUI illustrating the different water scores from 1 to 3. For each water score, an image is shown to the user of a sample difficulty, from a water score of 1 which appears relatively easy with no water hazards to a water score of 3 which has a large body of water abutting the green as illustrated in the image presented to the user.

Length—In block 116, the total length score is determined. A classification of "one" represents a short golf course where maximum length is up to a first predefined yardage amount, such as 6499 yards. A classification of "two" representing a moderate length golf course where maximum length is up to a second predefined yardage amount, such as 6998 yards. A classification of "three" representing a golf course of significant length where maximum length is greater than the second predefined yardage amount, such as 6999 yards or longer. This same classification system will be used to evaluate course length for "women's" tee and "senior" tees.

Figure 6A:
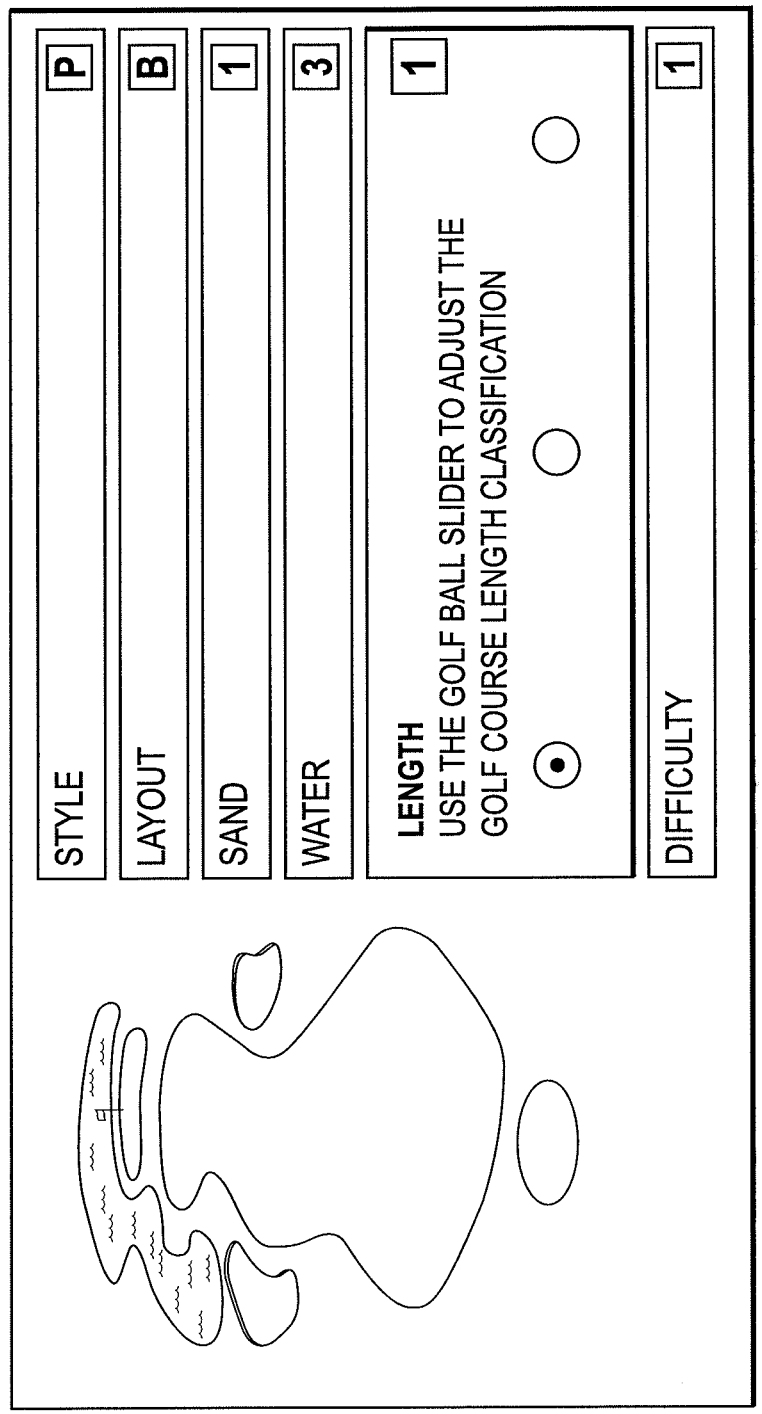
FIGS. 6A, 6B, and 6C (collectively FIG. 6) illustrate graphical user interfaces inputting the length score for the tee-to-green personality design according to some embodiments.
Figure 6B:
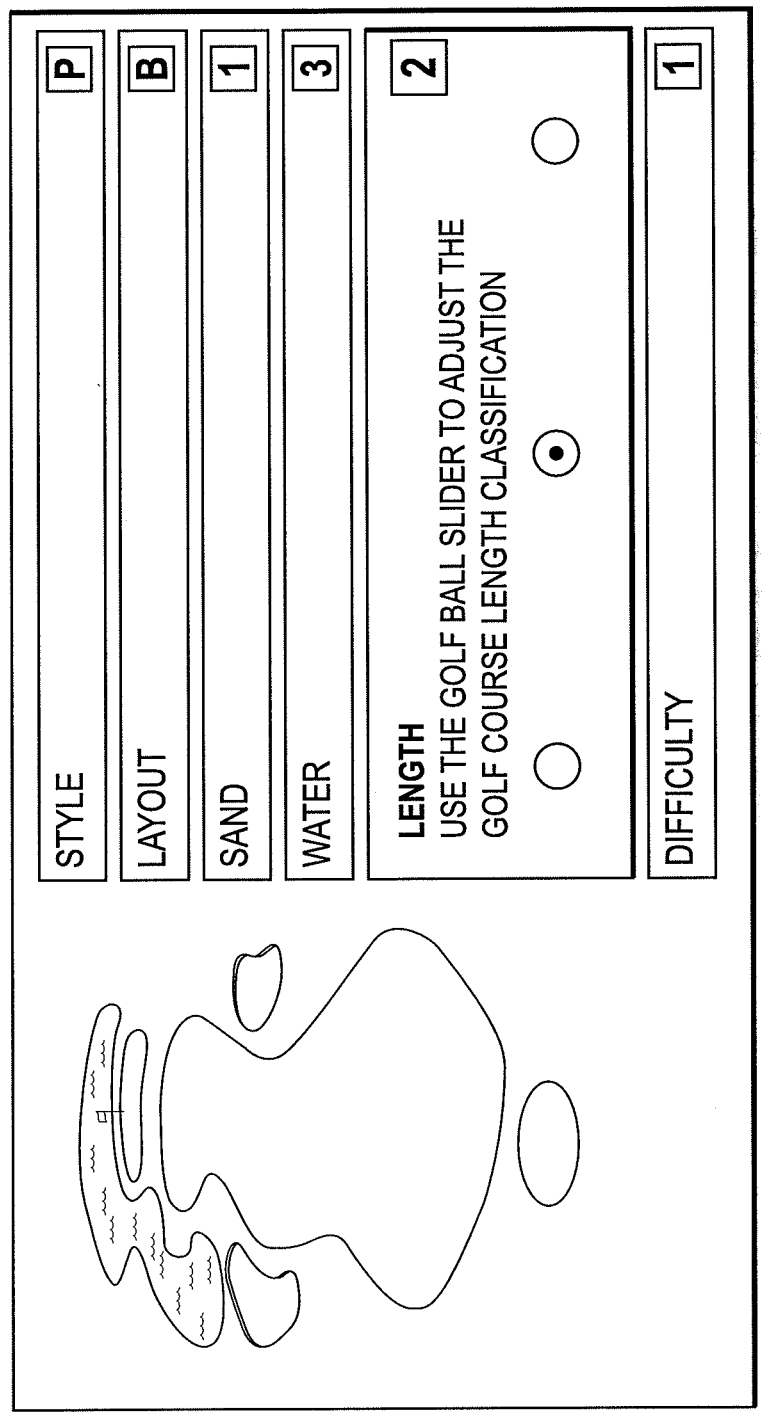
Figure 6C:
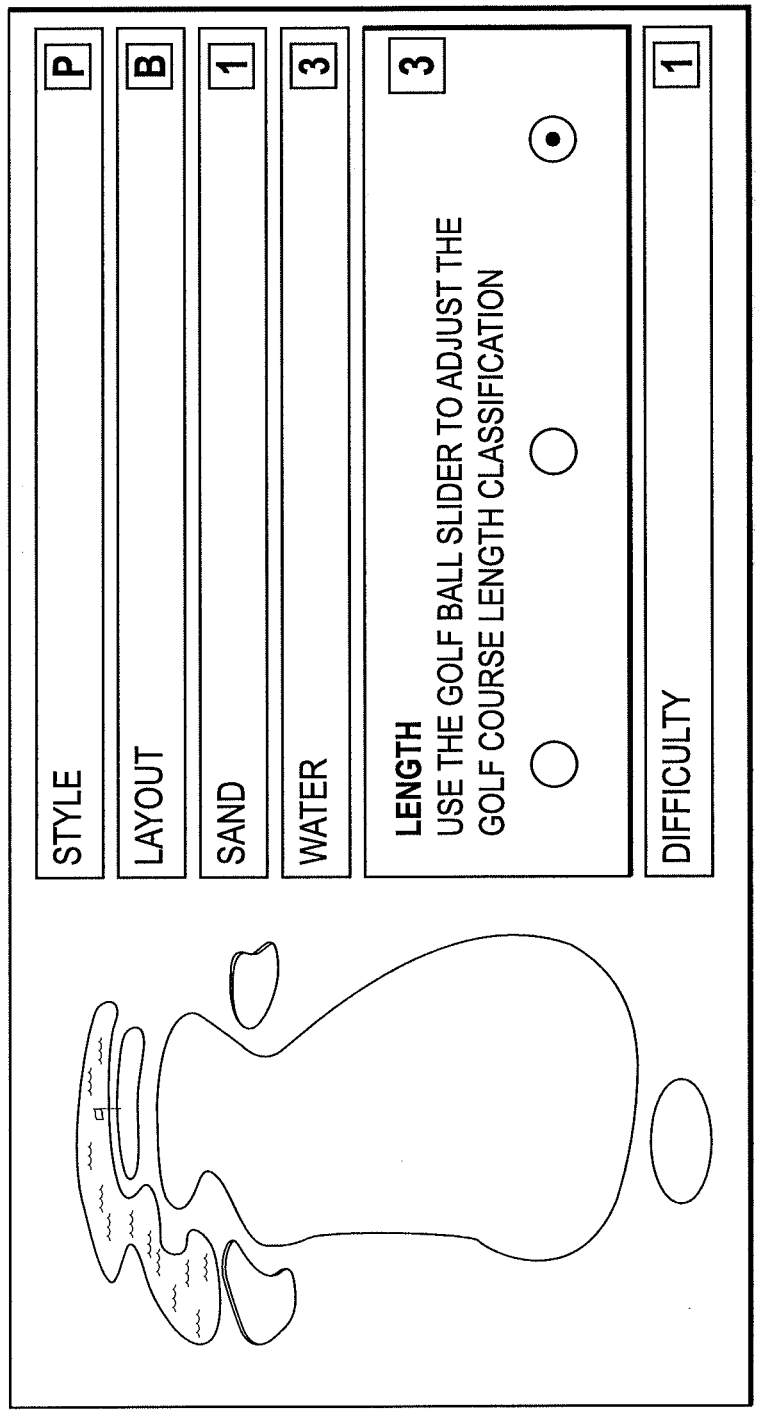

FIGS. 6A-C illustrate the GUI illustrating the different length scores from 1 to 3. For each length score, an image is shown to the user of a sample difficulty, from a length score of 1 which appears relatively easy with a short length according to the image to a length score of 3 which appears to have a long length from tee to the green as illustrated in the image presented to the user.

Figure 7A:
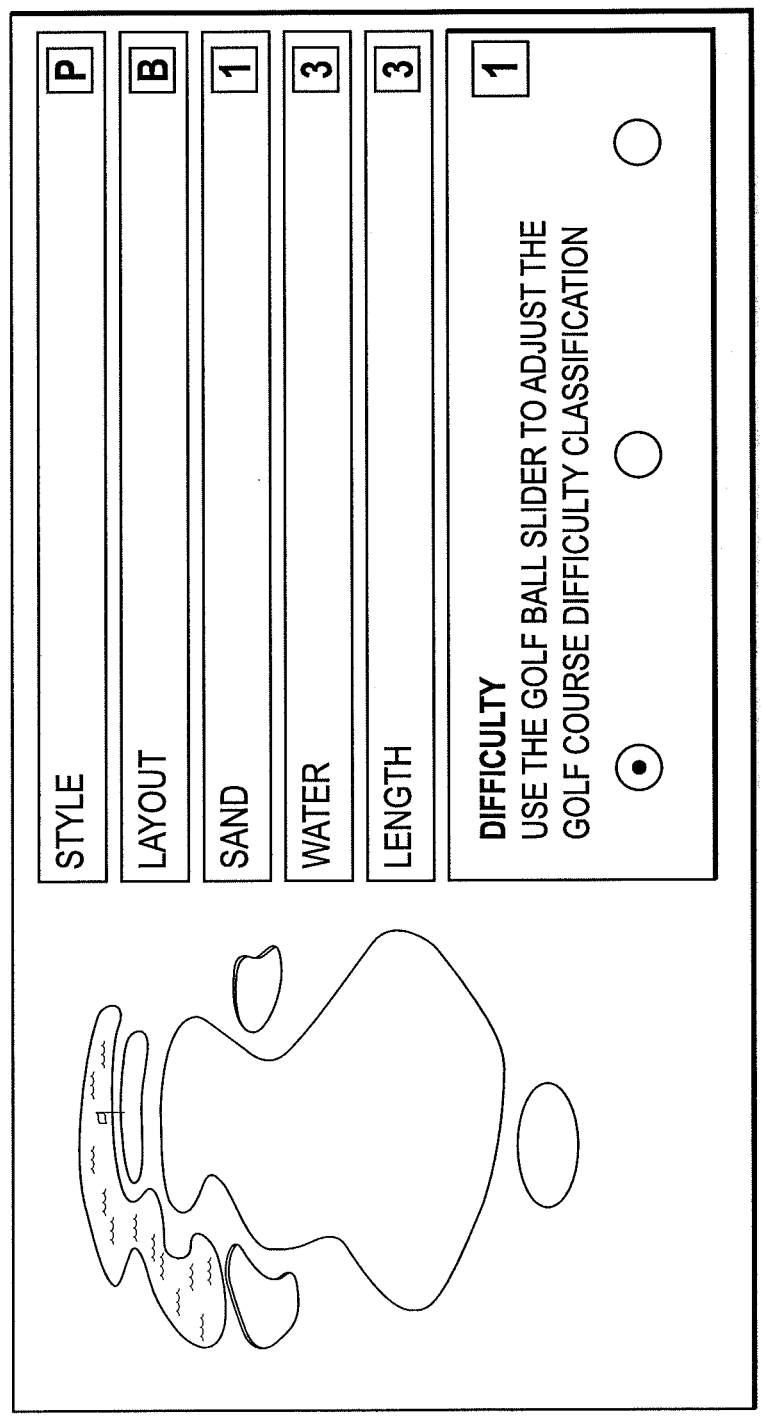
FIGS. 7A, 7B, and 7C (collectively FIG. 7) illustrate graphical user interfaces inputting the difficulty score for the tee-to-green personality design according to some embodiments.
Figure 7B:
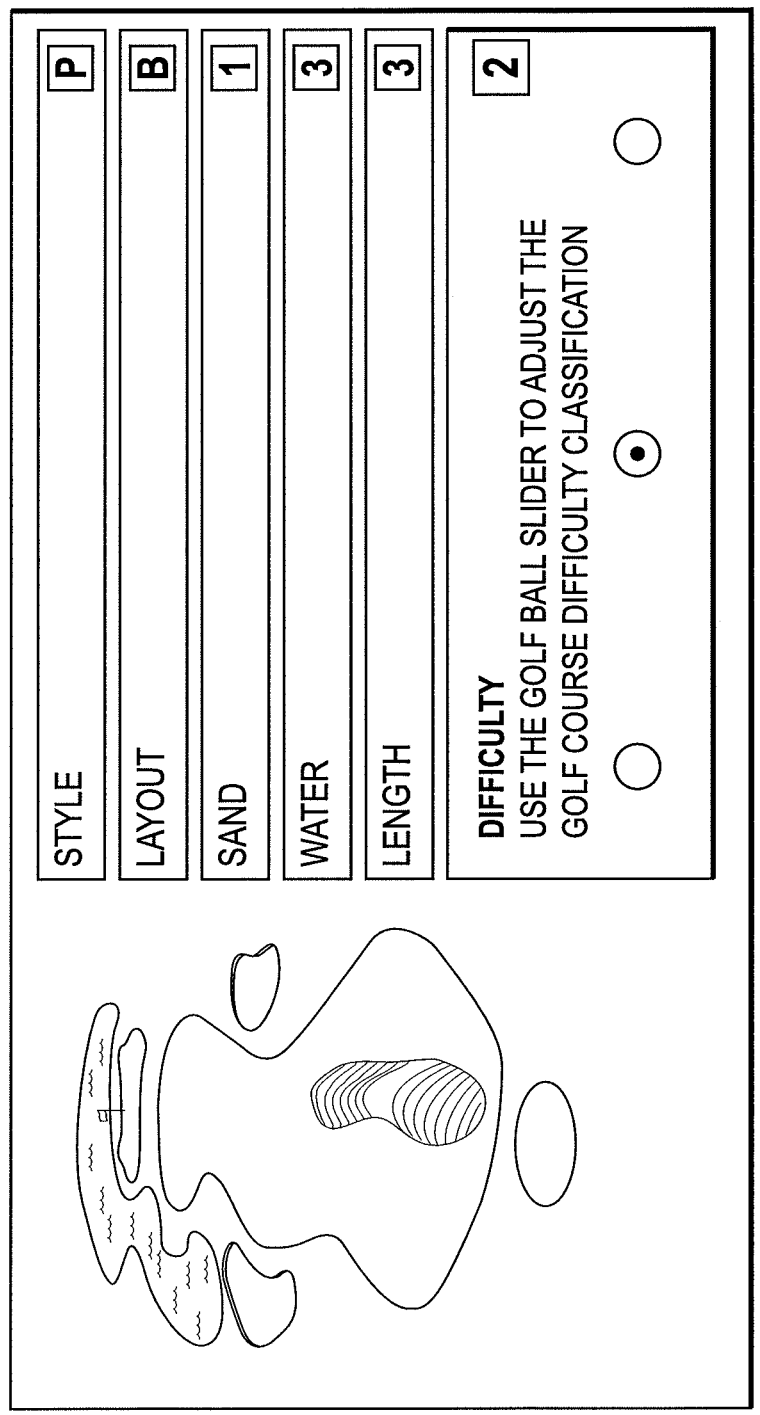
Figure 7C:
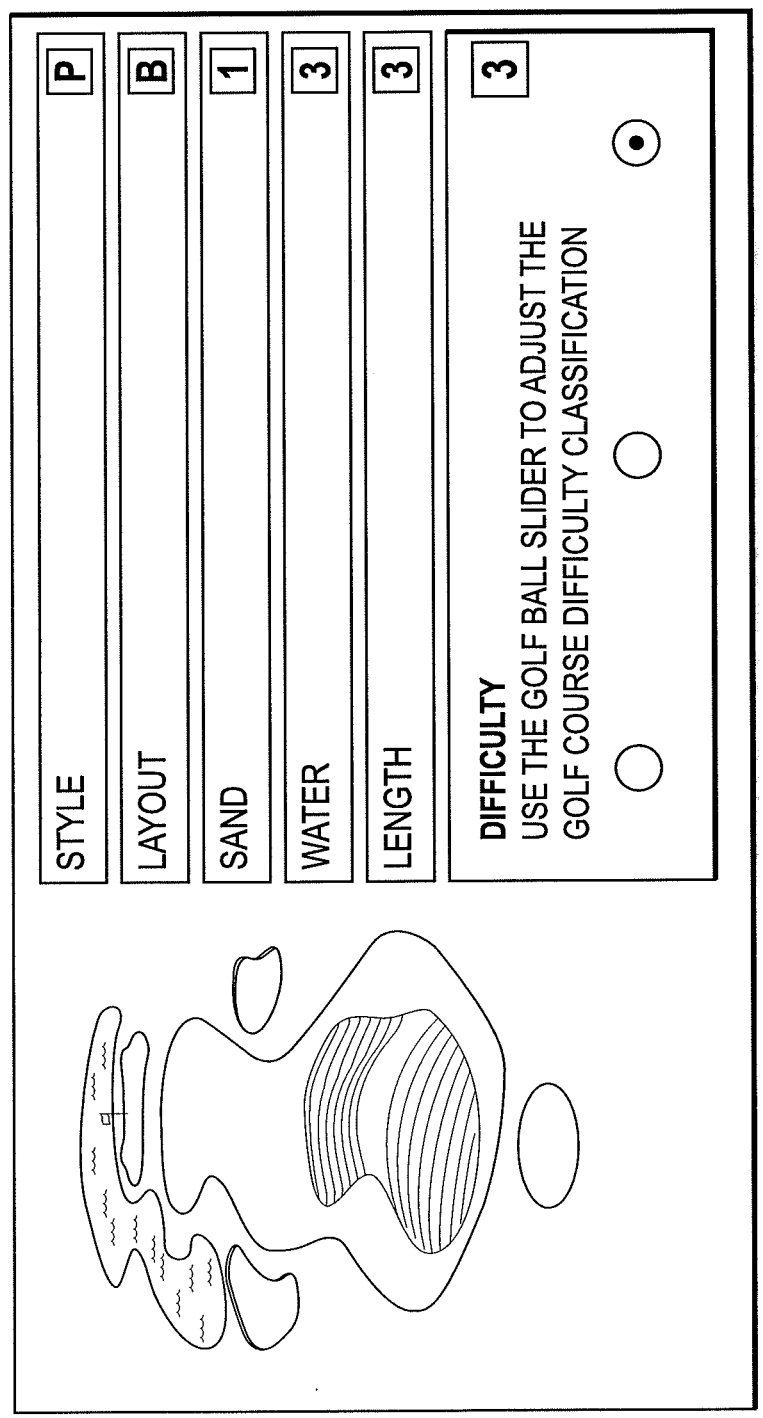

Difficulty—In block 117, the difficulty is determined as a classification of one, two or three based on the overall difficulty of the golf course considering all of the statistical data available. This difficulty may be pulled from other databases or may be a subjective calculation using all of the above-discussed characteristics. FIGS. 7A-C illustrate all of the characteristics presented above in each image presented to the user based on the difficulty score selected by the user. Other factors may also be included in the difficulty score in addition to the above characteristics, such as topography, amount of trees, other hazards, wind, temperature, climate, etc.

Figure 2A:
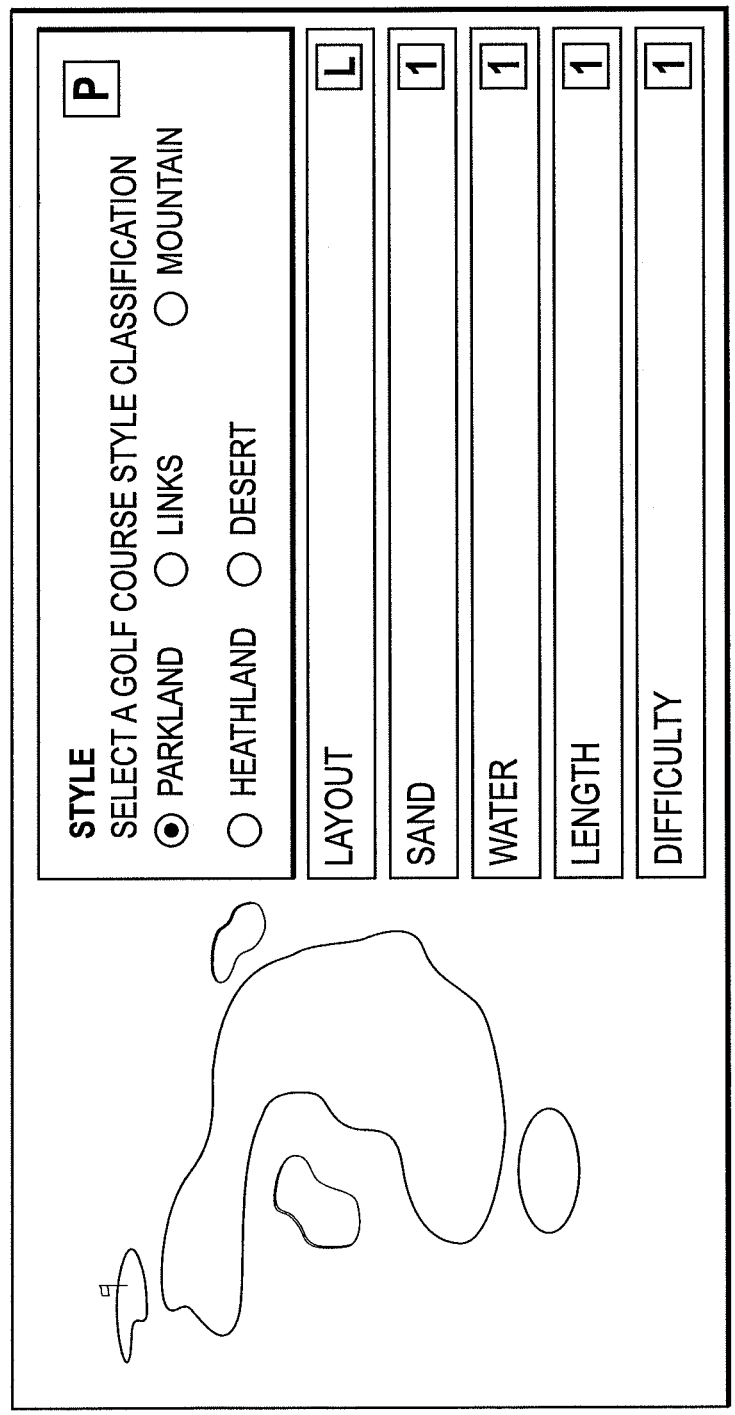
FIGS. 2A, 2B, 2C, 2D, and 2E (collectively FIG. 2) illustrate graphical user interfaces of inputting the style for the tee-to-green personality design according to some embodiments.
Figure 2B:
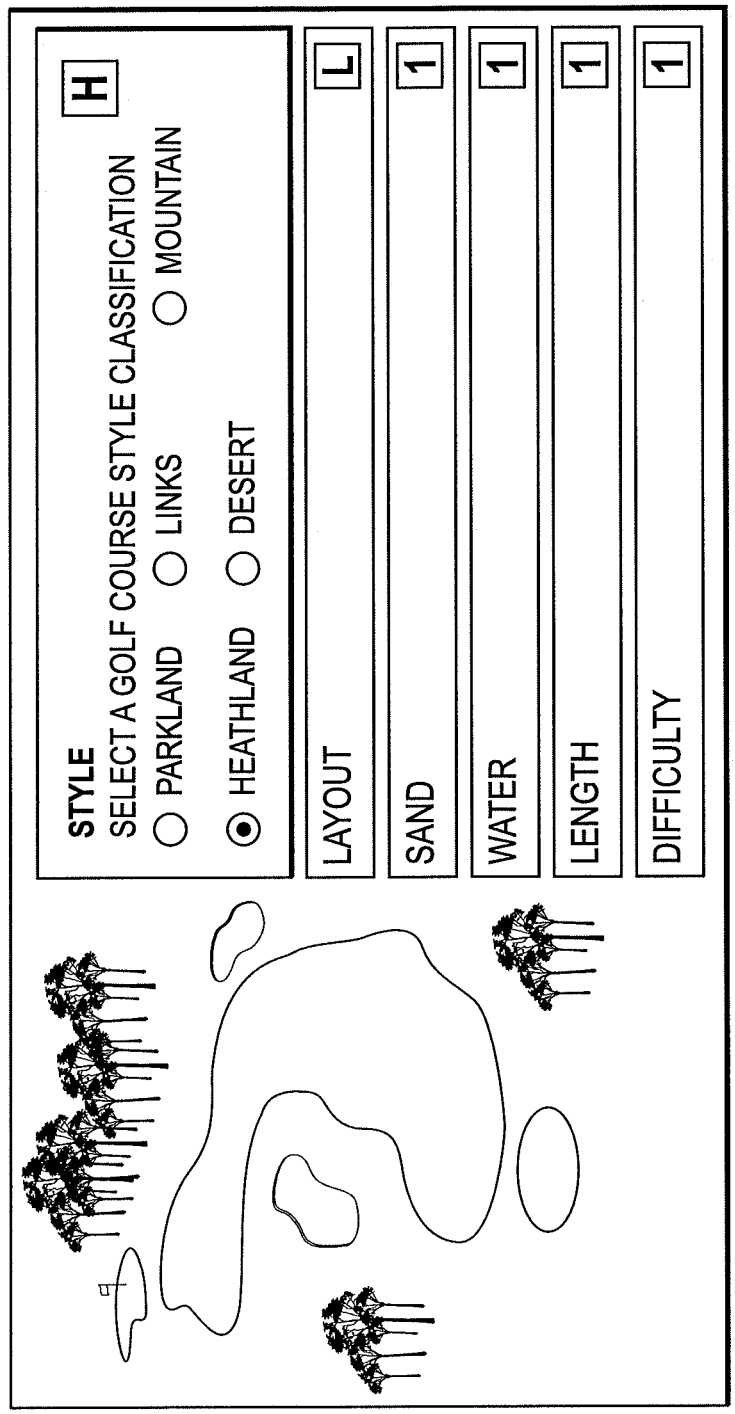
Figure 2C:
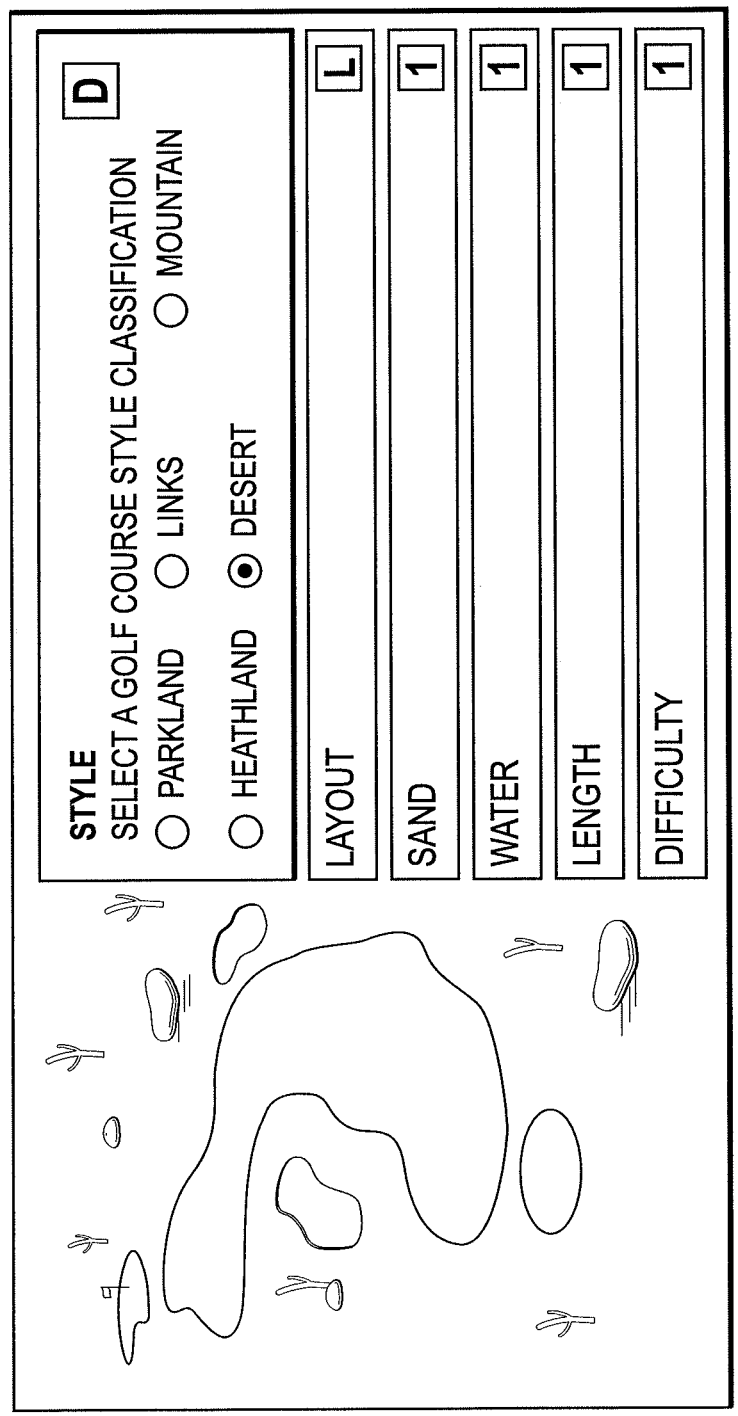
Figure 2D:
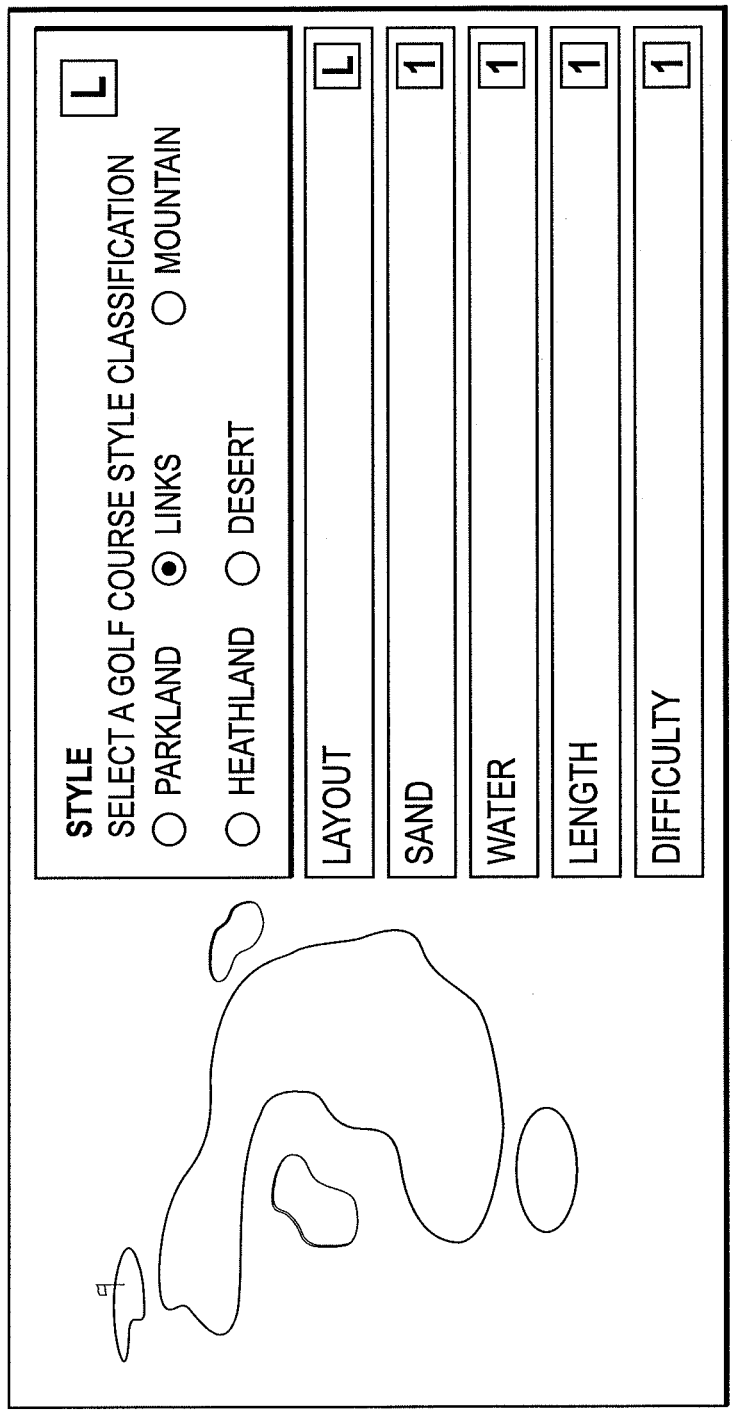
Figure 2E:

Style—In block 118, each golf course in the database is analyzed and then receives a classification by evaluating the location, design, vegetation, grass type and aesthetics. The classifications may be of "Parkland" (corresponding to a "P" score), "Heathland" (corresponding to a "H" score), "Links" (corresponding to a "L" score), "Desert" (corresponding to a "D" score), or "Mountain" (corresponding to a "M" score). As mentioned above, a person evaluating the golf course makes a decision on what style a course is by evaluating the design, geography, grass types and visual surroundings of the golf course. FIG. 2A illustrates an example of the Parkland Style. FIG. 2B illustrates an example of the Heathland Style. FIG. 2C illustrates an example of the Desert Style. FIG. 2D illustrates an example of the Links Style. FIG. 2E illustrates an example of the Mountain Style.

All six characteristics (i.e., style, layout, sand score, water score, length score, and difficulty score) create a total personality score in accordance with one embodiment. The golf courses are entered into the database by inputting the personality score along with other relevant golf course information to display to users. An example is "Golf Course ABC, Personality Score of PL2233", as shown in FIG. 19 which means that the style is Parkland, the layout is dogleg left, the sand score is a "2", the water score is a "2", the length score is a "3" and the overall difficulty is a "3".

In block 119, all of the above characteristics and calculations are entered in a database and stored associated with the respective golf course. Other information is also stored in the database entries including the location of the golf courses, costs associated with playing the golf courses, the golf course designer, location-specific information (e.g., temperatures, under construction info, etc.), golf course images that were used in calculating the golf course score personality, hole analysis, recommendations for playing each hole, expert commentary, history of the golf course, and any other information about the golf courses are saved to the database.

In block 120, the user interface allows users to search for golf courses by selecting a golf course personality based on the criteria listed. In 121, for example, a user selects golf course with a personality score of "PB2233", in block 122, the user hits "search" and sends the query to the database.

In block 123, the database filters all golf courses using the user's search parameters. In one embodiment, the user may weight each parameter of the golf course. For example, if the golfer really wanted to emphasis the sand score, the user can place a 10 by the sand score parameter and 1s by the other parameters. This would indicate to the system to return and sort the results with the sand score as highest.

Searching the Golf Courses in the Database

The GCFS User Interface—The GCFS user interface allows golfers to create their very own tee-to-green personality based on the same six criteria as the golf courses. Golfers select from each of the six criteria from a menu on the right side of their screen and choose the classifications that define their playing preferences the best. As they are creating and revising their preferences the fitting system gives them a "real time" visual display of a sample golf hole on the left side of their screen. This allows the system to instantly communicate back to the golfer the physical attributes that a golf course will have based on the tee-to-green personality score that they are creating. Ultimately this tool allows the user to communicate with the GCFS in a visually stimulating format that is interesting and creative, all the while feeding the system the information it needs to match them to a golf course that fits their playing preferences. Once the user is satisfied with their tee-to-green personality score they submit it to the system to instantly give the user a list of golf courses that fit their preferences the best. The list of golf courses is displayed along with a graphic that shows the user the accuracy of their match in percentage format as well as a chart showing which of the six scores matched and which ones did not.

At FIGS. 1A and 2-7, the application's interface allows users to design a golf course tee-to-green personality. The golf course animations (e.g., actual or cartoon images of the hole of the golf course, scenes or locations of golf courses, etc.) change according to their selections to give the user instant feedback on how their choices are affecting the tee-to-green personality design.

(FIG. 1B) Each menu option expands when it is clicked on so that the user can select their classification choices for each golf course design element.

Figure 13:
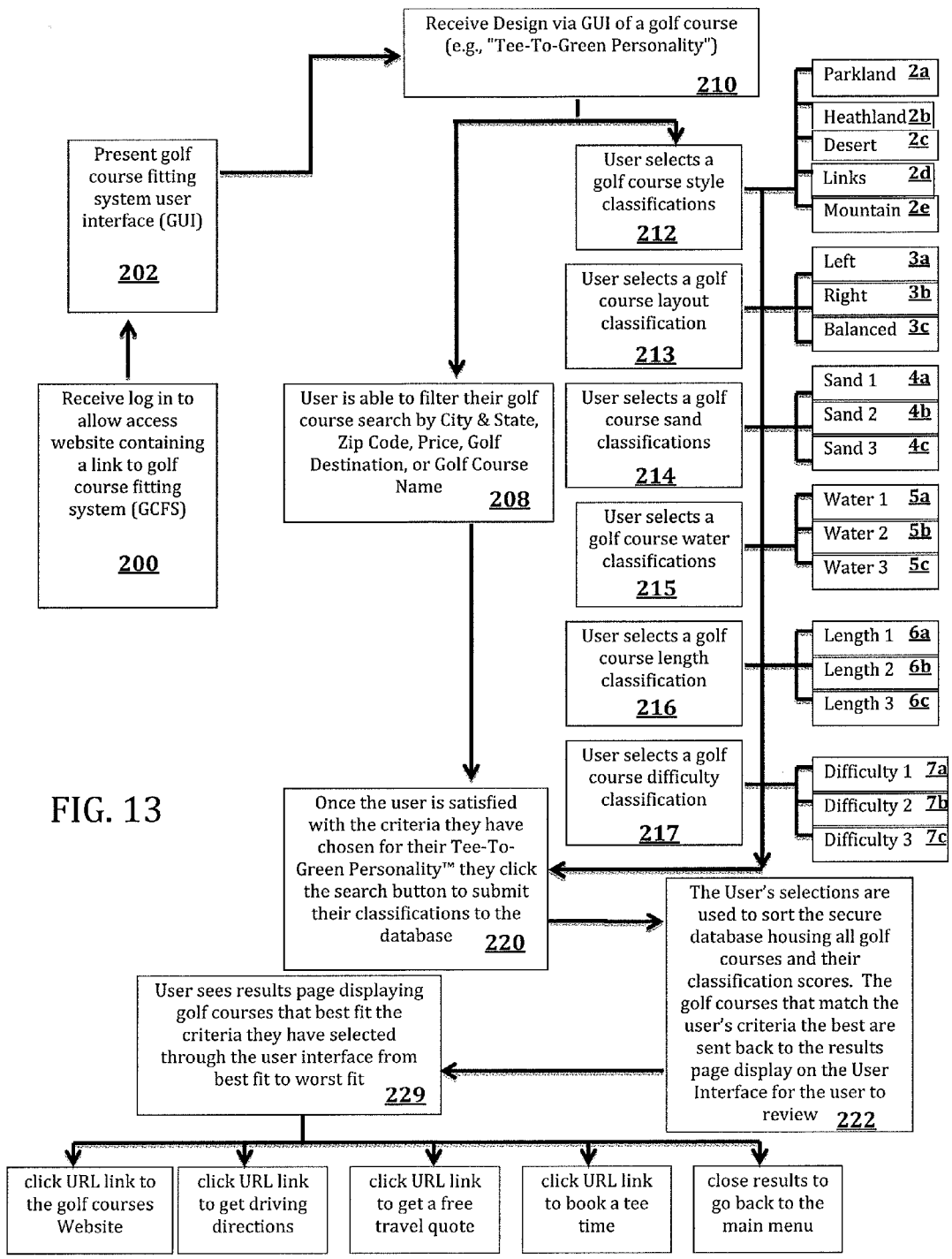
FIG. 13 is a method for searching the golf course fitting system in accordance with an embodiment of the present invention.

FIG. 13 illustrates a method of operating the golf course fitting system according to an embodiment. In block 200, a user logs onto the managing entity's website and access website containing a ling to the GCFS. The user may click on a link that takes them to the GCFS interface (block 202).

In block 210, an interface is presented to the user allowing the user to enter one or more of the six characteristics of the golf course personality (the tee-to-green personality). For example, the user may select "PC2233" or just a sand score of 3 or a combination of water score of "2" and a difficulty of "1". This is represented by block 212-217 whereby the user can select the style (See FIGS. 2a-2e), layout (see FIGS. 3a-3c), sand score (see FIGS. 4a-4c), water score (see FIGS. 5a-5c), length score (see FIGS. 6a-6c), or difficulty (see FIGS. 7a-7c) or any combination thereof. As shown in FIGS. 2-7, the user just need to change the input parameters from 1-3 for the sand, water, length or difficulty and change the layout to L, R, or B as well as the style between the 5 styles (H, L, P, etc.). This is done in the graphical user interface.

In addition to block 210, the user may also filler the golf course query terms to include the city/state, zip code, price, golf destination, or golf course name, as indicated in block 208.

In block 220, one the user is satisfied with the criteria they have chosen for their Tee-To-Green Personality, they click the search button to submit their classifications to the database.

In block 222, the user's selections are used to sort the secure database housing all golf courses and their classification scores. The golf courses that match the user's criteria the best are sent back to the results page display on the user interface for the user to review. The system then queries the database to sort the results and return the results that match the parameters of the user's search. Different sorting routines may be used as is discussed below.

In some embodiments, the system may use a weighting method to sort the database and display the results and percentage match. For example, in one embodiment, style is weighted first, layout is weighted second, sand is weighted third, water is weighted forth, length is weighted fifth, and difficulty is weighted sixth. Each category may be sorted in this order to produce the results that are sent back to the user.

It should be understood that other weighting orders are possible to sort the database by the users selections. Examples of other weighting schemes are provided below.

In one embodiment, there is no weighting but there is a sorting of each category equally and then a displaying of the results. For example, if the user wants to see all golf courses that have a sand score of "2", the system then filters out all of the golf courses that do not have a "2" score. Then the user can filter the results for all courses that are a Links course ("L" style score). The system then filters all of the golf courses with a "2" sand score that also have an "L" style. The user can then select one of the results or further filter the results with other characteristics or other parameters.

In another embodiment, the system allows the user to weight the six characteristics or categories with a "1" through "6" (or other weighting methodologies) in any order the user desires. For example, if the user wants to weight the difficulty as a 5 out of 6 and the sand score as a 2 out of 6 (because possibly the user wants a tough golf course but easy with regard to sand traps), the user can provide such a selection. The system then will retrieve the requested data.

In yet another embodiment, the system allows the user to create their own weights or priorities of each category as they make their selections on the user interface. For example, the user can select the weighting system (1 to 100, 1 to 10, "easy" "medium" or "hard", etc.). The system will then correlate the new weighting system to currently stored data. For example, if the user defined the weighting system to be "easy", "medium" or "hard", the system will interpret "easy" as a value of "1", "medium" as a value of "2" and "hard" as a value of "3" and search the system using the numerical values.

In yet another embodiment, the system allows the user to select "NA" or "don't care" for the categories they are not concerned about and these unselected categories would not affect the search results.

There are other methods that could be used to create a personality score for a golf course. For example, a scoring system could evaluate sand and water hazards for each regulation shot but it could also factor which side of the hole the hazard is on. This would allow for additional information to be used in order to determine whether a golf course favors the left side or the right side. This could help determine what kind of ball flight a golfer might prefer to play on a specific golf course. For example, some golf courses are easier on the left side of the course and some golf courses are easier on the right side of the golf course, as illustrated in block 11a.

Another way to score sand and water would be to simply add up the total amount of these types of hazards on the golf course rather than how many times a regulation shot might hit one of these hazards during a round of golf. The total number could be calculated and then broken into separate classes in order to rank them. Moreover, the total number of each hazard type could be added to the "hole by hole" scoring system to give the calculation one more component.

Another way to score sand, water and length would be to have more classes than three. Each parameter could be given an unlimited amount of classes in order to get a very precise score for each parameter for the user. Or each parameter could be given, 4, 5, 6, 7, etc. amount of classes to sort the information with more detail.

Another way to evaluate golf course personalities would be to have certified people such as PGA professionals or other "experts in the game of golf" to analyze the golf courses by using their personal opinion and expert analysis of the golf course design and layout. PGA professionals or other "experts in the game of golf" could fill out a standardized golf course personality scorecard based on a scoring system like the ones mentioned and then submit the results for entry into the database.

Another way to evaluate a golf course would be to have the general public submit what they think the personality score should be after playing a round of golf at that golf course or walking the golf course or because they are a member or person who has a lot of experience playing a particular golf course. Golfers could then log into a website and enter what they think the score should be. Or golfers could log into a website and access and standardized scorecard to fill out that has a systematic scoring system like the ones we have mentioned and then submit for entry into the database.

Another way to evaluate a golf course would be to combine statistical data and personal opinion of either an "expert in the game of golf" or the general public or a combination of both to give the final golf course personality score a combination of both statistics and opinion. The computer stats could be given a certain weight and the personal opinion votes could be given a certain weight.

Another way to evaluate a golf course would be to add more categories to the golf course personality score: types of grasses—record the types of grasses used; green difficulty—record the slopes, grass types and typical speeds of greens; fairway Difficulty—record mounds, grass types, hills and obstacles; number of "forced carries"—these are areas that the golfer must be able to hit his or her ball over in the air in order to "carry" over it (there is not an option to roll the ball along the ground); how narrow each hole is with regard to (1) fairway width; and (2) proximity to hazards; and types of specials the golf course offers or the types of tee times the golf course sells to the public (example—9 hole rounds, walking rounds, military rates, senior rates, early morning rounds, league rounds, singles golf, couples golf, junior golf, lessons or tournaments).

There are different methods that could be used for the user interface to gather data and build a golf course personality score made by the user to match to the database. These will be discussed below.

One way the user interface could gather data is by using sliders or buttons with only text and no animations to allow the user to build a golf course personality score.

Another way the user interface could gather data is by using animations and a touch screen desk monitor or a touch screen hand held monitor (Pad or smart phone) and allow the user to manipulate the animations by using their fingers to expand and contract the sand bunkers, water hazards, length, difficulty, and course style.

Yet another way the user interface could gather data is by having images of sand bunkers, water hazards, bumps, mounds, tee boxes and the user selects these images from the menu and then drags them into the hole graphic where the images are placed and then resized to create a golf course personality that the user likes.

Another way the user interface could gather data is to ask users questions (textually or verbally recorded) about what kind of shots they like to hit and what kinds of experiences they like to have during a round of golf. For example the question may be "do you like difficult putts?", and the database would sort results by golf course green difficulty rankings according to the users answer. By way of another example the question may be "do you like to curve your golf shots to the left?" and the database would sort results by golf courses that are left dogleg dominant or that are easier on the left side. As another example, the question presented to a golfer may be "do you like to hit out of sand?", and the database would sort results by golf courses sand rankings according to the users answer.

Still yet another way the user interface could gather data would be to list detailed descriptions of the classes and choices that the user has to pick from and they click on whatever choices they want to build their golf course personality score. For example, the user would be presented with the prompt "I want a golf course that plays_____click one of the following choices" with the following options: A—6500 yards of less; B—6501-7000 yards; and C—7001 yards or longer. The user would answer this question and the database sort the result accordingly.

Another way the user interface could gather data would be to ask the user questions and allow them to "fill in the blank" for answers. For example, the system would prompt "I would like to play a golf course that plays at least_____long (fill in the blank)." The user then writes—"7000" in the blank space.

Another way the user interface could gather data is to have the user log into an interface or email questionnaire that prompts them to simply use their own words to describe the type of golf course that they would like to play. The results could then be reviewed by a person who then finds a golf course in the database that best matches their description and sends them the results. Alternatively, the results could then be reviewed by a computer program that searches for Key words and then locates golf courses in the database that have matching key words to describe the type of design that they are.

In block 229, the results are presented to the user displaying the golf courses that best fit the criteria selected through the user interface using the inputted parameters. The golf courses are ranked from best to worst. A link is then provided to take the user to the golf course displayed.

Figure 9:
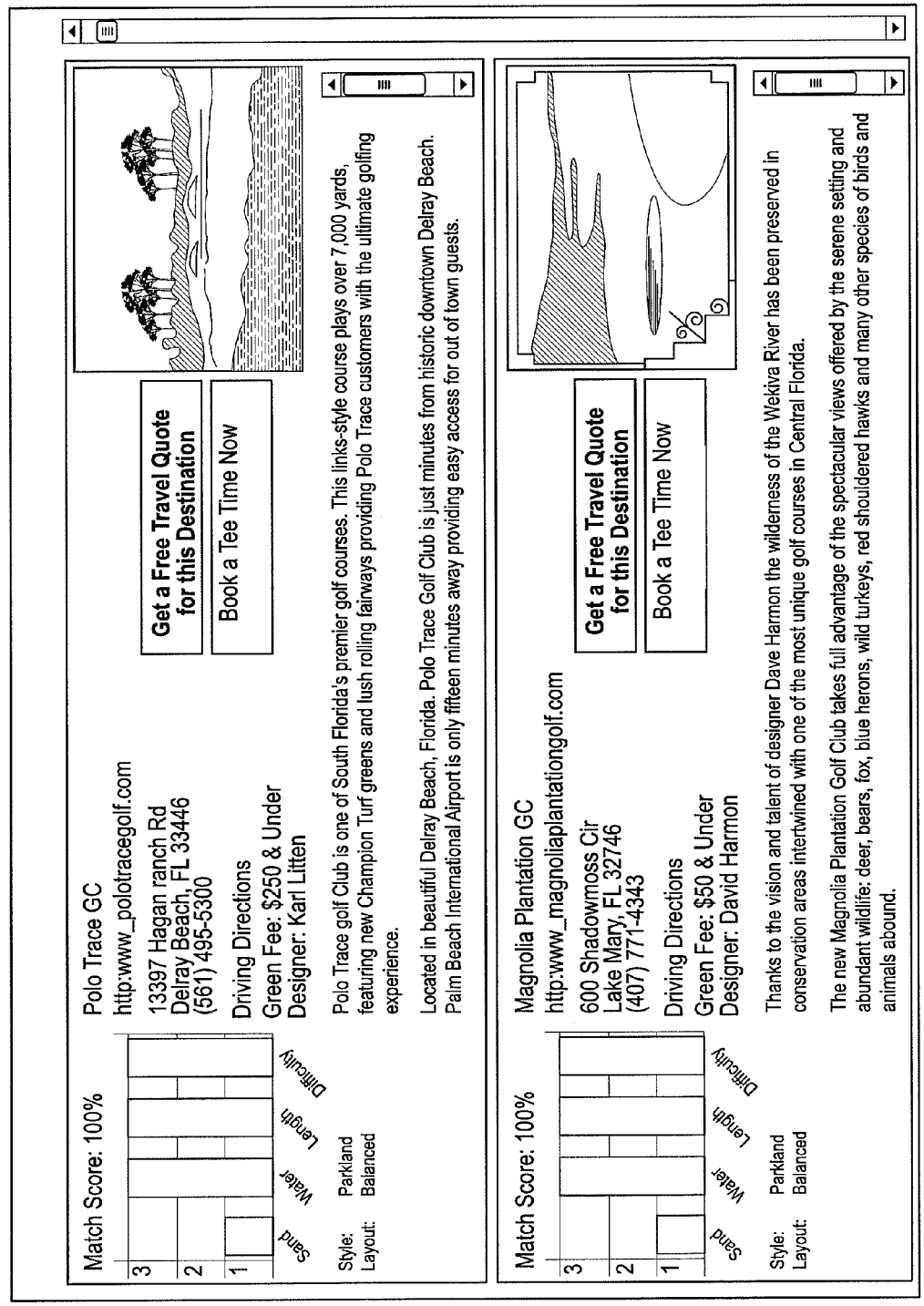
FIG. 9 illustrates a graphical user interface of results of a query of a golf course fitting system in accordance with embodiments of the present invention.

FIG. 9 illustrates an example of the results of a search. As shown, there are two exact matches for the user's query based on a Parkland style, sand score of 1, balanced layout, water score of 3, length score of 3 and difficulty score of 3. The locations of the golf courses are noted as well as the score of the results. Contact information, including a link to the course, the address of the course and the like is also displayed. All other information in the database may also be displayed to the user. The user is allowed to save these golf courses to the user's profile as a favorite and may also personally rank the course.

Figure 10:
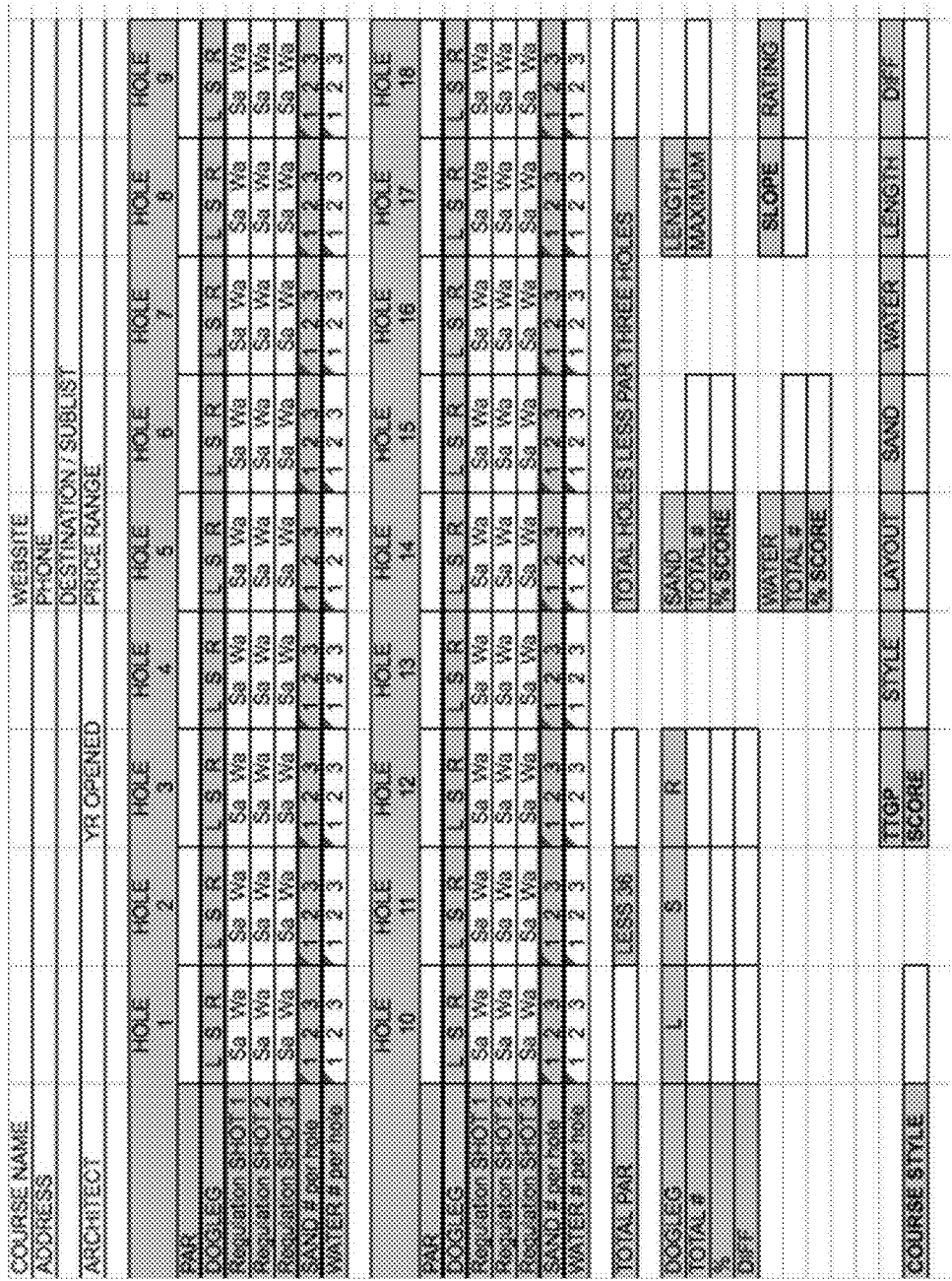
FIG. 10 illustrates a golf course score card according to one embodiment.

FIG. 10 illustrates the score-card. This scorecard is used in determining the score for each hole using the sand, water, length, layout parameters. As shown, there are three possible regulation shots per hole and for each shot may have a score for a sand point and/or a water point (shown as "Ss" and Wa"). The total par amount is shown. The total sand amount is shown per hole (shown as "1 2 3" where one of these numbers will be circled). The total water amount is shown per hole (shown as "1 2 3" where one of these numbers will be circled). The dogleg score is shown per hole as L, S, or R (left, straight or right). The total number of dogleg lefts are tallied, the total number of dogleg right are tallied and the total number of straight holes are tallied. Other information is also compiled using this score-card. This information is a single entry into the database for that single golf course.

Figure 12:
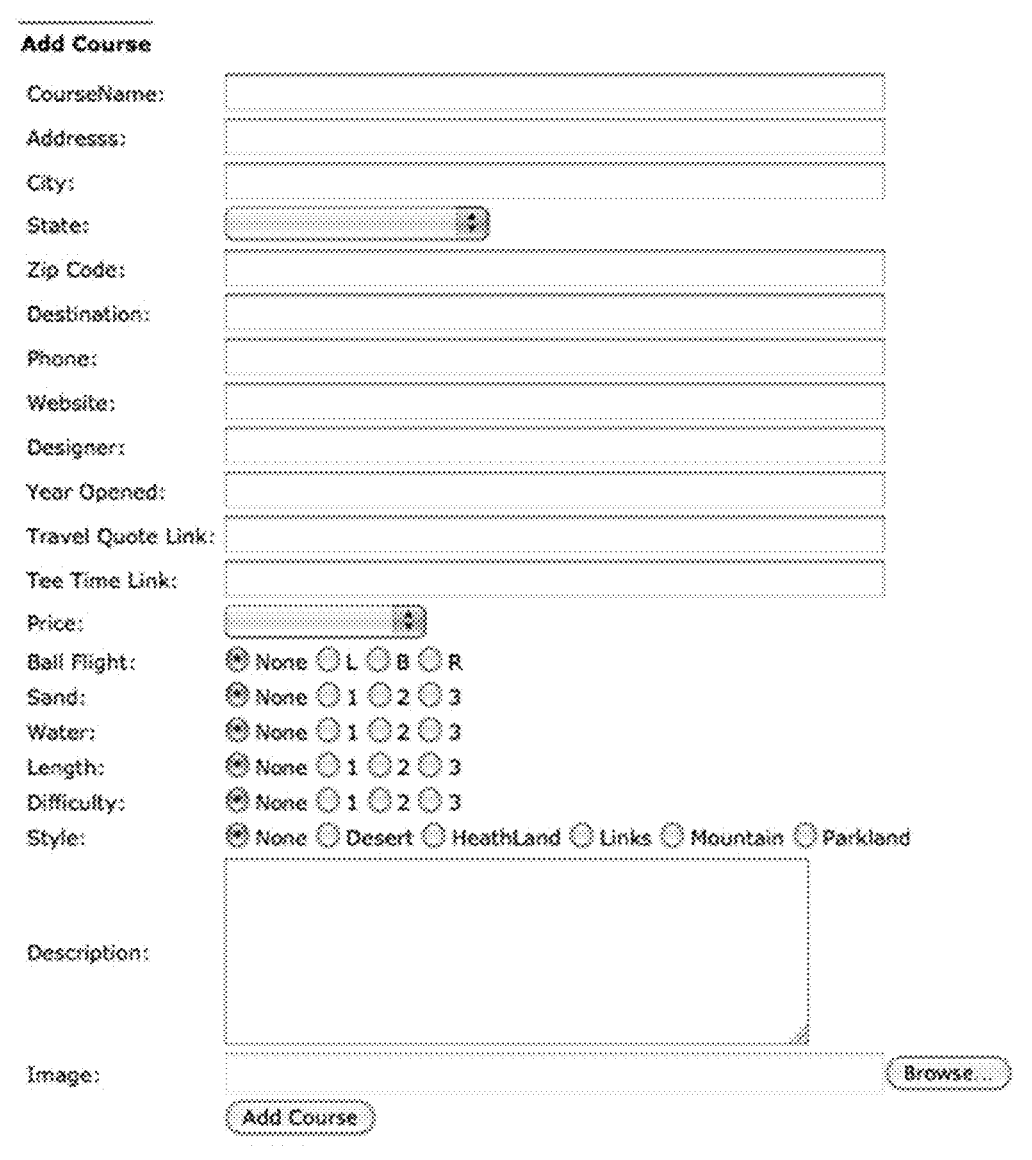

An example of the database populated is shown in FIG. 11. FIG. 12 shows a database interface that allows the administrator to added/edit database entries for a golf course.

It is noted that there are other avenues for achieving and searching for a golf course personality score. For example, the mobile application of the program where the users interface is accessed on a mobile device such as an I-Pad or smart phone. Users can perform the same type of search with this device as the first user interface and database designed for a personal computer station.

The interface and database can be reproduced on different size scales for other companies to use on their websites. The interface can be downloaded onto other entity's websites for them to offer the service to their customers. The interface can be downloaded on the personal computers to allow users to access it from their desktop screens at any time. The golf course personality concept could become a standardized format for describing golf course designs and layouts to the general public. This would allow golfers to quickly understand the design characteristics of every golf course that exists. For example, a golf course has a personality of "HB333". A golfer can quickly understand the following from such score: Heathland style course, balanced layout with lots of sand and water, can play long if we want it to and is a difficult course. This could save golfers a lot of time and or money that they might spend trying to acquire this information on their own.

The course personality score can allow, "suggestive selling of golf courses" —The golf course personality score can allow golf marketing companies to suggest certain golf courses to certain golfers based on the golf course design personality a golfer says they like to play. For example, golfer "A" signs up on the companies email list and registers his or her preferred golf course personality as a "PR1111". The company can then send Golfer "A" specials and notifications from golf courses with this same golf course personality score of "PR1111".

Figure 15:
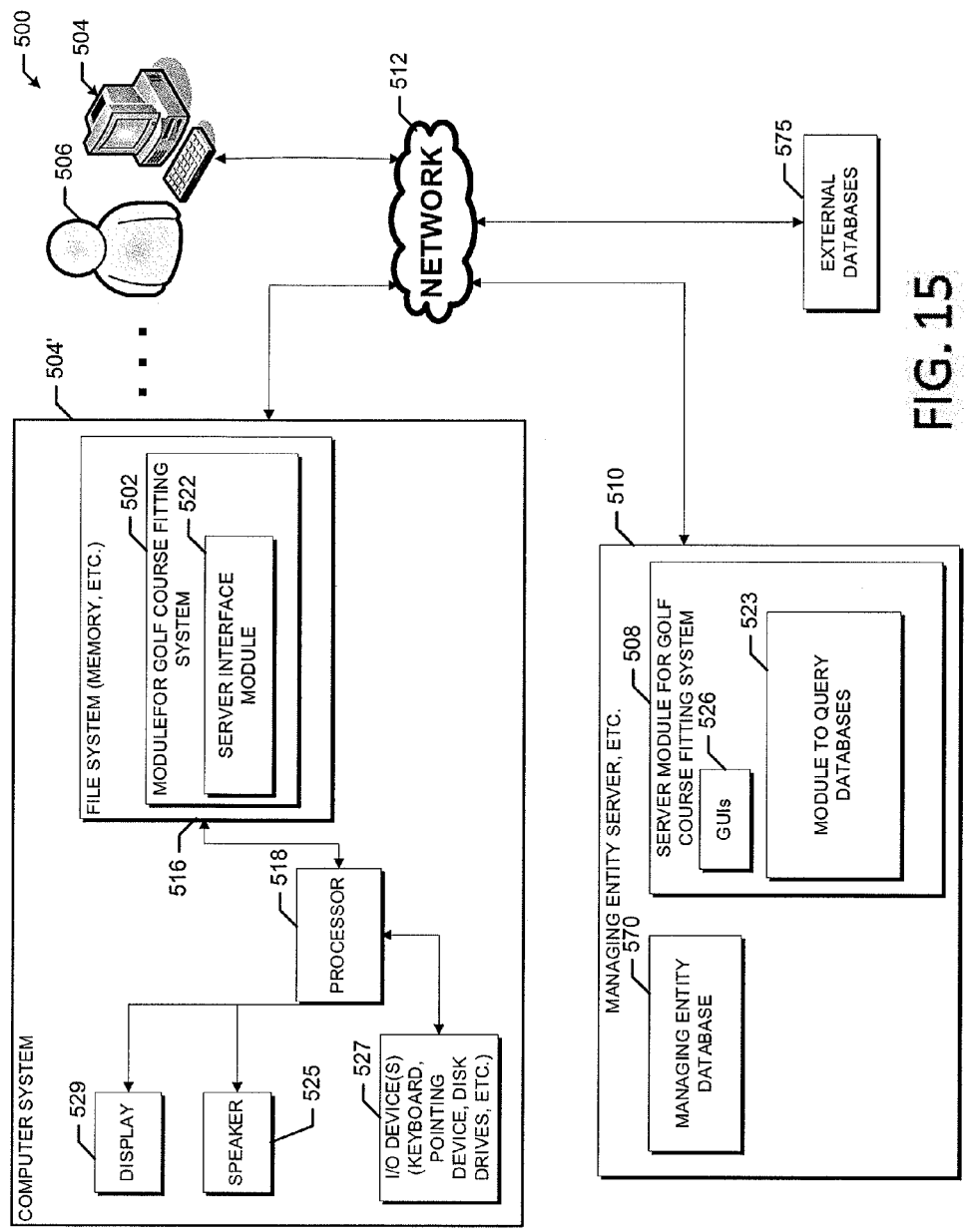
FIG. 15 illustrates a golf course fitting system in accordance with an embodiment of the present invention.

FIG. 15 is a block schematic diagram of a golf course fitting system 500 in accordance with one or more embodiments of the present invention. System 500 may include a software module 502 operable on a computer system 504, or similar device of a user 506 or client. System 500 also includes a golf course fitting system module 508 operable on a server 510 (hereinafter "server golf course fitting system module") at and/or controlled by a managing entity. The managing entity is an entity which manages the golf course fitting system software and provides this software on the internet for users to access and use.

Server 510, including database 570 (and also optionally computer system 504), may be considered the term "system" as used herein. Server 510 is accessible by computer system 504 via a network 512 such as the Internet. One or more of the methods discussed herein may be embodied in or performed by software module 502 and/or server golf course fitting system module 508, alone or in conjunction with a user. That is, some of the features or functions of the presently described methods may be performed by software module 502 on computer system 504, and other features or functions of the presently described methods may be performed on server golf course fitting system module 508. In another embodiment, all of the features or functions of the presently described methods may be performed by server 510 or computer system 504.

Managing entity database 570 may be operable on server 510 or may be operable separate from server 510 and may be communicable by users 506 using their respective computer systems 504 or clients. Managing entity database 570 includes various data relating to the schools. Managing entity database 570 includes a database entry for each golf course.

The Managing entity database (also referred to as the golf course fitting system database) is a database designed to house every golf courses tee-to-green personality score. The database was designed to be sorted by the input of the GCFS's user interface by matching tee-to-green personality scores. The GCFS was also designed with a golfer database that allows users to save their tee-to-green personality score in the system for future use. The GCFS was also designed with a "group" database for golf groups of two or more so that the system can match groups to golf courses based on a combination of all of their tee-to-green personality scores.

Network 512 is the Internet. Each computer system 504' may be similar to the exemplary computer system 504 and associated components illustrated in FIG. 15.

Each software module 502 and/or server golf course fitting system module 508 may be a self contained system with embedded logic, decision making, state based operations and other functions that may operate in conjunction with collaborative applications, such as web browser applications, email, telephone applications and any other application that can be used to communicate with an intended recipient. Golfers may utilize the self contained systems as part of a process of analyzing and searching golf courses.

Software module 502 may be stored on a file system 516 or memory of the computer system 504. Software module 502 may be accessed from file system 516 and run on a processor 518 associated with computer system 504.

Software module 502 includes various modules that perform steps as discussed herein.

Software module 502 may also include a module to interface with the server (hereinafter "server interface module"). The server interface module allows for interfacing with modules on server 510 and communicates with server 510 to upload and/or download requested data and other information. As such, computer 504 may act as both a requesting device and an uploading device. Additionally, the server interface module allows for transmission of data and requests between the computer 504 and server 510. For example, the server interface module 522 allows for a query message to be transmitted to the server and also allows for receipt of the results. The server interface module distributes data received to the appropriate server module for further processing.

Any query may take the form of a command message that presents a command to the server, which in turn compiles the command and executes the requested function, such as retrieving information from database 570.

Software module 502 may also include graphical user interfaces ("GUIs"), as previously presented. Software module 502 may present one or more predetermined GUIs to permit the user to input/select data into the system, direct computer 504 to perform certain functions, define preferences associated with the query, or allow the user to input any other information and/or settings. The GUIs may be predetermined and/or presented in response to the user attempting to perform operations (such as those described previously in FIG. 14), queries or enter information and/or settings. Golf course fitting system module 508 may generate the predetermined GUIs, which may be presented to the user on a display 529 of computer system 504. The GUIs also presents users notifications. The GUIs may allow the user to custom define a query as discussed herein. The GUIs can be custom-defined and execute in conjunction with other modules and devices on the user's computer 504, such as I/O devices 527, the module to interface with the server 522, or any other module. Examples of the GUIs are discussed herein with regard to FIGS. 1-12.

User computer system 504 may also include a display 529 and a speaker 525 or speaker system. Display 529 may present applications for electronic communications and/or data extraction, uploading, downloading, etc. and may perform controlling and display of the golf course data, notifications, search parameters, etc. as described herein. Any GUIs associated with golf course fitting system module 508 and application may also be presented on display 529. Speaker 525 may present any voice or other auditory signals or information to user 506 in addition to or in lieu of presenting such information on display 529.

User computer system 504 may also include one or more input devices, output devices or combination input and output device, collectively I/O devices 527. I/O devices 527 may include a keyboard, computer pointing device, or similar means to control operation of applications and interaction features described herein. I/O devices 527 may also include disk drives or devices for reading computer media, including computer-readable or computer-operable instructions.

As noted above, server golf course fitting system module 508 may reside on server 510. It should be understood that server golf course fitting system module 508 may also, or alternatively, reside on another computer or on a cloud-computing device. One or more of the sub-modules of the server golf course fitting system module 508 may all run on one computer or run on separate computers.

Software module 502 may also include a module 522 to interface with the server (hereinafter "server interface module"). Server interface module 522 allows for interfacing with modules on server 510 and communicates with server 510 to upload and/or download requested data and other information. As such, computer 504 may act as both a requesting device and an uploading device. Additionally, server interface module 522 allows for transmission of data and requests between the computer 504 and server 510. For example, server interface module 522 allows for a query message to be transmitted to the server and also allows for receipt of the results. Server interface module 522 distributes data received to the appropriate module for further processing.

Server golf course fitting system module 508 includes graphical user interfaces ("GUIs") 526. Server golf course fitting system module 508 may present one or more predetermined GUIs to permit the user to input/select data, direct computer 504 to perform certain functions, define parameters associated with the query, or allow the user to input any other information and/or settings. GUIs 526 may be predetermined and/or presented in response to the user attempting to perform a query or enter information and/or settings. Server golf course fitting system module 508 generates the predetermined GUIs 526, which may be presented to the user on a display 529 of computer system 504. GUIs 526 also present users notifications. GUIs 526 allow the user to custom define a query, such as changing a changing a query's search parameters. GUIs 526 can be custom-defined and execute in conjunction with other modules and devices on the user's computer 504, such as I/O devices 527, the module to interface with the server 510, or any other module. The GUIs are generated by server 510 and allow the user to access the GUI using a web browser to enter data on the GUI through a software as a service ("SaaS") or other application programming interface ("API"). Thus, when the user enters data on the GUI, server golf course fitting system module 508 stores the data in managing entity database 570. Examples of GUIs are illustrated with regard to FIGS. 1-9.

Server golf course fitting system module 508 also includes a module 523 to query databases (hereinafter "query module"). Query module 523 allows a user to query data on server 510 and, thereby, from managing entity database 570 or from other databases 575. The query may take the form of a command message that presents a command to the server 510, which in turn compiles the command and executes the requested function, such as retrieving information from database 570 or database 575. Query module 523 communicates with server 510 to upload a query and download requested items via server interface module 522. After transmission of a query message and retrieval of the query results, query module 523 may store the retrieved data in the memory for future retrieval.

External database(s) 575 are connected to network 512 so that server 510 can retrieve information therefrom. External database(s) 575 are databases managed by private golf-associated entities who have given permission to the managing entity of server 510 to access information on external database(s) 575. External database(s) 575 are remote from the managing entity in the sense that the managing entity does not control the computer systems of the external entity, and vice-versa. Data that are contained on the external database(s) 575 include golf course data, difficulty rankings, and other information data about golf courses that could replace and/or complement the managing entity database. Server 512 is therefore able to query the external database(s) 575 for data regarding golf course data.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for creating a golf course database, comprising
    selecting a golf course to determine a golf course personality score;
    identify golf course style design of the golf course;
    determine an amount of regulation golf shots;
    record data for each golf hole of the golf course, whereby the data for each golf hole comprises the golf hole orientation, an amount of regulation sand shots, and an amount of regulation water hazard shots;
    record a total length of the golf course;
    calculate, using a computer, a sand score by summing the amount of regulation sand shots for all holes of the golf course and dividing by the number of regulation golf shots;
    calculate a water score by summing the amount of regulation water shots for all holes of the golf course and dividing by the number of regulation golf shots;
    calculate a total amount of dog leg right holes, dog leg left holes and straight holes for the golf course; and
    save in a database entry for the golf course the personality score of the golf course comprising the golf course style design, the total length, the total amount of sand points, the total amount of water points, and the total amount of dog leg right holes, dog leg left holes and straight holes for the golf course.

2. The method of claim 1, further comprising grouping the water scores lower than 25% as a low level, grouping the water scores between 25%-49% as a medium level, grouping the water scores greater than 49% as a high level.

3. The method of claim 1, further comprising identifying a total length lower than 6500 as a low level, identifying a total length between 6500 and 6998 as a medium level, and identifying a total length of greater than 6999 as a high level.

4. The method of claim 1, further comprising grouping the sand scores lower than 69% as a low level, grouping the sand scores between 70%-89% as a medium level, grouping the sand scores greater than 90% as a high level.

5. The method of claim 1, further comprising:
    comparing the total amount of dog leg lefts, the total amount of dog leg rights and the total amount of straight holes;
    in response to the total amount of dog leg rights being greater than the total amount of dog leg lefts, indicating that the course is more of a dog leg right;
    in response to the total amount of dog leg lefts being greater than the total amount of dog leg rights, indicating that the course is more of a dog leg left; or
    in response to the total amount of straight holes being greater than either the total amount of dog leg lefts or the total amount of dog leg rights, indicating that the course is more of a straight course.

6. A method for a golf course searching comprising:
    providing an interface to search a golf course database comprising a different database entry for each golf course;
    receiving, using a computer of a user over a network, a design of a golf course, wherein the design indicates at least two of: a desired style of a golf course, a desired golf course layout, a desired golf course sand difficulty level, a desired golf course water difficult level, or a desired golf course length level;
    querying the golf course database with the design;
    providing the user with results of the query where the results comprises a list of golf courses that meet the design via the query so as to allow the user to select a golf course from one of the results;
    selecting golf courses to determine a golf personality score; and
    for each golf course:
        determine an amount of regulation golf shots;
        record a total length of the golf course;
        calculate, using a computer, a total amount of sand points by summing an amount of regulation sand shots for all holes of the golf course and dividing by the number of regulation golf shots;
        calculate a total amount of water points by summing an amount of regulation water shots for all holes of the golf course and dividing by the number of regulation golf shots;
        calculate a total amount of dog leg right holes, dog leg left holes and straight holes for the golf course; and
        save in a database entry for the golf course the personality score of the golf course comprising the golf course style design, the total length, the total amount of sand points, the total amount of water points, and the total amount of dog leg right holes, dog leg left holes and straight holes for the golf course.

7. The method of claim 6, wherein the query is received from a user over a network and the results of the query.

8. The method of claim 6, further comprising providing an option to book a tee time with one of the golf courses from the query results.

9. The method of claim 6, further comprising providing the user with a travel quote along with providing the user with results of the query.

10. The method of claim 6, wherein the design is selected by presenting a graphical user interface to the user to select a style of a golf course, a golf course layout, a golf course sand level, golf course water level, and golf course length level and an image corresponding to the design is provided to the user.

* * * * *